(12) United States Patent
Peh et al.

(10) Patent No.: US 9,846,709 B2
(45) Date of Patent: *Dec. 19, 2017

(54) EQUI-JOINS BETWEEN SPLIT TABLES

(71) Applicant: SAP SE, Walldorf (DE)

(72) Inventors: Thomas Peh, Heidelberg (DE); Holger Schwedes, Kraichtal (DE); Wolfgang Stephan, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,943

(22) Filed: Aug. 11, 2015

(65) Prior Publication Data
US 2015/0347514 A1 Dec. 3, 2015

Related U.S. Application Data

(63) Continuation of application No. 14/297,223, filed on Jun. 5, 2014, now Pat. No. 9,135,282, which is a continuation of application No. 13/117,894, filed on May 27, 2011, now Pat. No. 8,793,287.

(51) Int. Cl.
G06F 17/30 (2006.01)
(52) U.S. Cl.
CPC .. *G06F 17/30289* (2013.01); *G06F 17/30466* (2013.01); *G06F 17/30498* (2013.01); *G06F 17/30545* (2013.01); *G06F 17/30584* (2013.01)

(58) Field of Classification Search
CPC ......... G06F 17/30584; G06F 17/30498; G06F 17/30545; G06F 17/30386; G06F 17/30477

USPC .......................................... 707/809
See application file for complete search history.

(56) References Cited

U.S. PATENT DOCUMENTS

| 4,811,207 | A | | 3/1989 | Hikita et al. |
| 5,551,027 | A | * | 8/1996 | Choy ............... G06F 17/30321 |
| | | | | 707/999.201 |
| 5,551,031 | A | * | 8/1996 | M. Cheng ......... G06F 17/30498 |
| 6,226,639 | B1 | | 5/2001 | Lindsay et al. |
| 6,567,802 | B1 | | 5/2003 | Popa et al. |
| 6,944,633 | B1 | | 9/2005 | Higa et al. |
| 7,949,687 | B1 | * | 5/2011 | Sinclair ............ G06F 17/30312 |
| | | | | 707/758 |

(Continued)

OTHER PUBLICATIONS

Arie Segev, "Optimization of Join Operations in Horizontally Partitioned Database Systems", ACM Transactions on Database Sysems, vol. 11, No. 1 Mar. 1986.

(Continued)

*Primary Examiner* — Kris Mackes
*Assistant Examiner* — Tiffany Bui
(74) *Attorney, Agent, or Firm* — Fountainhead Law Group P.C.

(57) ABSTRACT

A join operation between split data tables includes providing value IDs. For each of the value IDs, a unique global ID may be associated with the value ID when the actual value represented by the value ID occurs among actual values comprising the second attribute of the second partition. For each identified unique global ID, the identified unique global ID may be paired with a document ID of a data record contained in a second partition stored at the second server in which the actual value in the data record is represented by the value ID associated with the identified unique global ID.

18 Claims, 27 Drawing Sheets

(56) References Cited

U.S. PATENT DOCUMENTS

| | | | |
|---|---|---|---|
| 8,266,138 B1 * | 9/2012 | Collins | G06F 17/30289 |
| | | | 707/706 |
| 2005/0187977 A1 | 8/2005 | Frost | |
| 2006/0136388 A1 | 6/2006 | Steinau et al. | |
| 2007/0271211 A1 * | 11/2007 | Butcher | G06F 17/30339 |
| | | | 707/999.001 |
| 2009/0089313 A1 * | 4/2009 | Cooper | G06F 17/30306 |
| | | | 707/999.102 |
| 2010/0241828 A1 * | 9/2010 | Yu | G06F 8/456 |
| | | | 712/30 |
| 2011/0055711 A1 * | 3/2011 | Jaquot | G11B 19/025 |
| | | | 715/736 |
| 2011/0202534 A1 * | 8/2011 | Allerton | G06Q 10/00 |
| | | | 707/738 |
| 2013/0290249 A1 * | 10/2013 | Merriman | G06F 17/30584 |
| | | | 707/610 |

OTHER PUBLICATIONS

S. Ceri, "Optimizing Joins between Two Partitioned Relations in Distributed Databases," Journal of Parallel and Distributed Computing, vol. 3, No. 2, Jun. 1986.
William Perrizo, Prabhu Ram, David Wenberg, "Distributed Join Processing Performance Evaluation", System Sciences, 1994, vol. I: Architecture, Proceedings of the 27th Hawaii Internation Conference. IEEE Comput. Soc. Press, Jan. 1994.
International Search Report (from a corresponding foreign application) EP12004039, dated Oct. 25, 2012.

\* cited by examiner

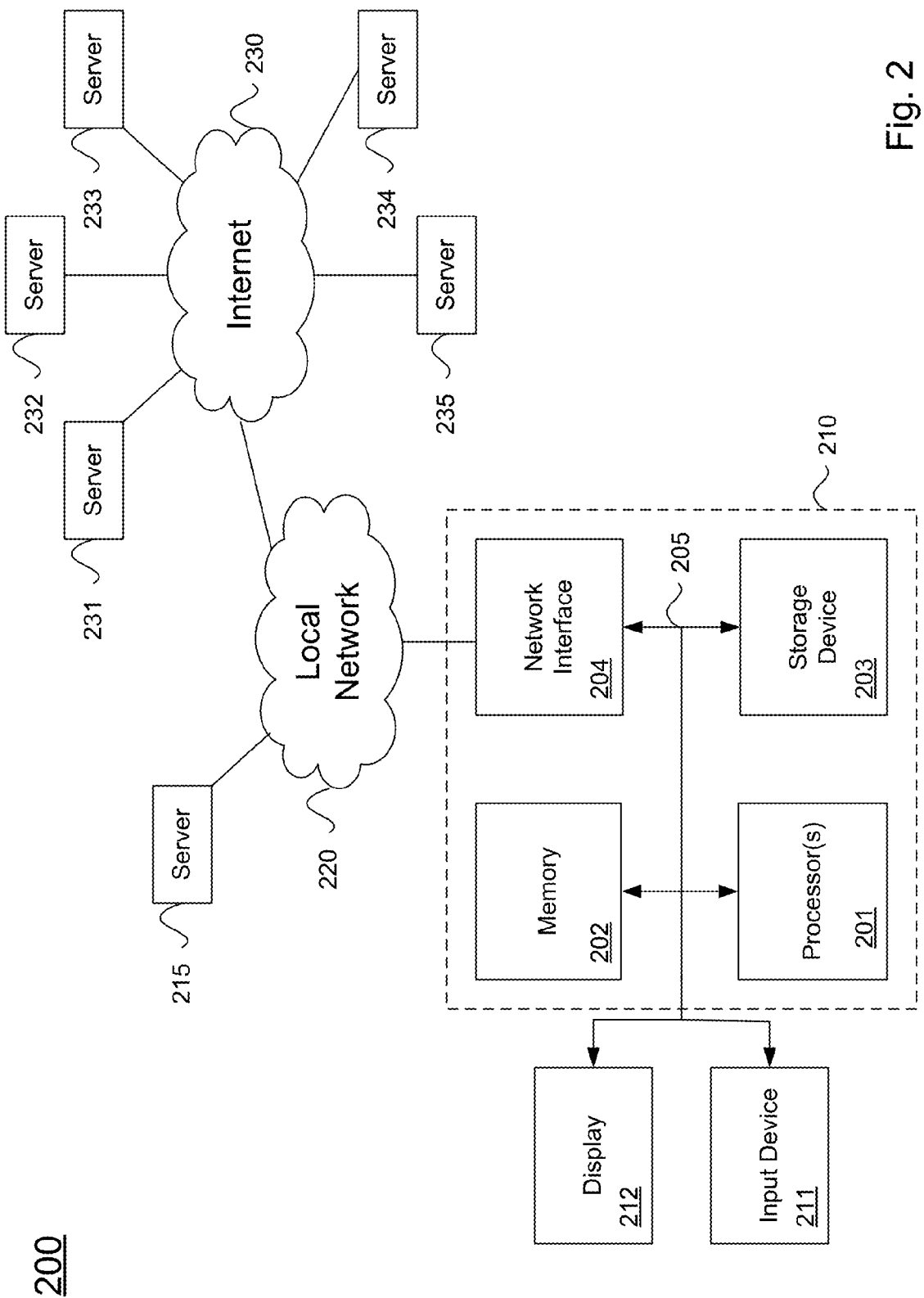

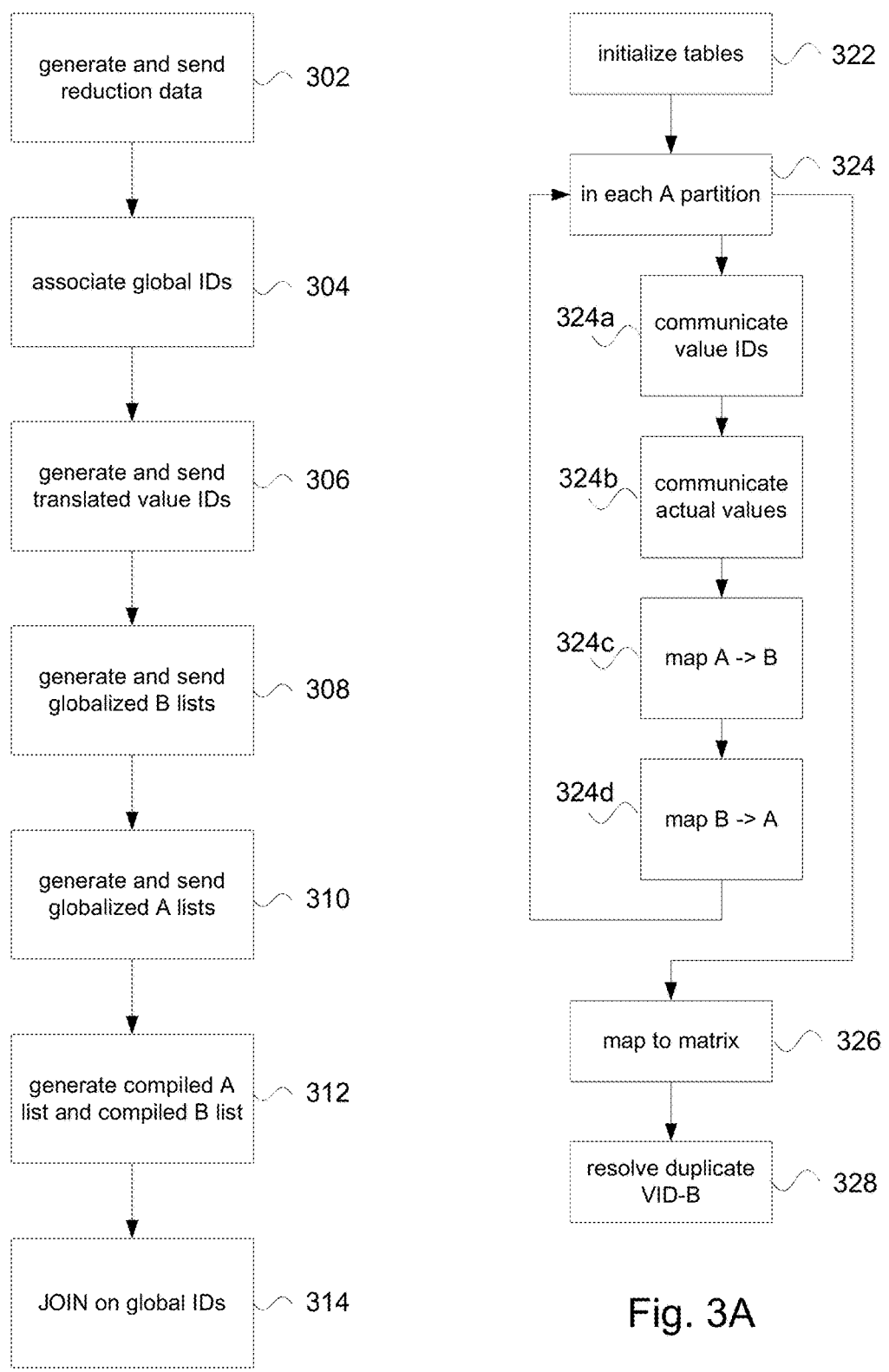

Data Table A  402

| Doc ID | NAME | atrr 3 | ... | attr X |
|---|---|---|---|---|
| 1 | Adam | *value* | | *value* |
| 2 | Hugo | *value* | | *value* |
| 3 | Markus | *value* | | *value* |
| 4 | Werner | *value* | | *value* |
| 5 | Markus | *value* | | *value* |
| 6 | Hugo | *value* | | *value* |
| 101 | Eva | *value* | | *value* |
| 102 | Herbert | *value* | | *value* |
| 103 | Hugo | *value* | | *value* |
| 104 | Werner | *value* | | *value* |
| 105 | Zacharias | *value* | | *value* |
| 106 | Herbert | *value* | ... | *value* |

Data Table B  404

| Doc ID | NAME | atrr 3 | ... | attr Y |
|---|---|---|---|---|
| 1 | Achim | *value* | | *value* |
| 2 | Adam | *value* | | *value* |
| 3 | Eva | *value* | | *value* |
| 4 | Adam | *value* | | *value* |
| 5 | Eva | *value* | | *value* |
| 6 | Zacharias | *value* | | *value* |
| 101 | Markus | *value* | | *value* |
| 102 | Hugo | *value* | | *value* |
| 103 | Eva | *value* | | *value* |
| 104 | Zacharias | *value* | | *value* |
| 105 | Markus | *value* | | *value* |
| 106 | Adam | *value* | ... | *value* |

Fig. 4

Index B 412

| Doc ID | NAME |
|---|---|
| 1 | Achim |
| 2 | Adam |
| 3 | Eva |
| 4 | Adam |
| 5 | Eva |
| 6 | Zacharias |
| 101 | Markus |
| 102 | Hugo |
| 103 | Eva |
| 104 | Zacharias |
| 105 | Markus |
| 106 | Adam |

Index A 414

| Doc ID | NAME |
|---|---|
| 1 | Adam |
| 2 | Hugo |
| 3 | Markus |
| 4 | Werner |
| 5 | Markus |
| 6 | Hugo |
| 101 | Eva |
| 102 | Herbert |
| 103 | Hugo |
| 104 | Werner |
| 105 | Zacharias |
| 106 | Herbert |

Join result 422

| Doc ID A | Doc ID B |
|---|---|
| 1 | 2 |
| 1 | 4 |
| 1 | 106 |
| 2 | 102 |
| 3 | 101 |
| 3 | 105 |
| 5 | 101 |
| 5 | 105 |
| 6 | 102 |
| 101 | 3 |
| 101 | 5 |
| 101 | 103 |
| 103 | 102 |
| 105 | 6 |
| 105 | 104 |

| value ID | Doc ID | NAME | atrr 3 | ... | attr X |
|---|---|---|---|---|---|
| 1 | 1 | Adam | value | | value |
| 2 | 2 | Hugo | value | | value |
| 3 | 3 | Markus | value | | value |
| 4 | 4 | Werner | value | | value |
| 3 | 5 | Markus | value | | value |
| 2 | 6 | Hugo | value | ... | value |

502b

| value ID | Doc ID | NAME | atrr 3 | ... | attr X |
|---|---|---|---|---|---|
| 1 | 101 | Eva | value | | value |
| 2 | 102 | Herbert | value | | value |
| 3 | 103 | Hugo | value | | value |
| 4 | 104 | Werner | value | | value |
| 5 | 105 | Zacharias | value | | value |
| 2 | 106 | Herbert | value | ... | value |

504a

| value ID | Doc ID | NAME | atrr 3 | ... | attr Y |
|---|---|---|---|---|---|
| 1 | 1 | Achim | value | | value |
| 2 | 2 | Adam | value | | value |
| 3 | 3 | Eva | value | | value |
| 2 | 4 | Adam | value | | value |
| 3 | 5 | Eva | value | | value |
| 4 | 6 | Zacharias | value | ... | value |

504b

| value ID | Doc ID | NAME | atrr 3 | ... | attr Y |
|---|---|---|---|---|---|
| 4 | 101 | Markus | value | | value |
| 3 | 102 | Hugo | value | | value |
| 2 | 103 | Eva | value | | value |
| 5 | 104 | Zacharias | value | | value |
| 4 | 105 | Markus | value | | value |
| 1 | 106 | Adam | value | ... | value |

Fig. 5

| 512a | NAME | value ID |
|---|---|---|
| | Adam | 1 |
| | Hugo | 2 |
| | Markus | 3 |
| | Werner | 4 |

Dictionary A₁

| 514a | NAME | value ID |
|---|---|---|
| | Achim | 1 |
| | Adam | 2 |
| | Eva | 3 |
| | Zacharias | 4 |

Dictionary B₁

| 512a | NAME | value ID |
|---|---|---|
| | Eva | 1 |
| | Herbert | 2 |
| | Hugo | 3 |
| | Werner | 4 |
| | Zacharias | 5 |

Dictionary A₂

| 514b | NAME | value ID |
|---|---|---|
| | Adam | 1 |
| | Eva | 2 |
| | Hugo | 3 |
| | Markus | 4 |
| | Zacharias | 5 |

Dictionary B₂

Fig. 5A partition $B_1$ partition $B_1$

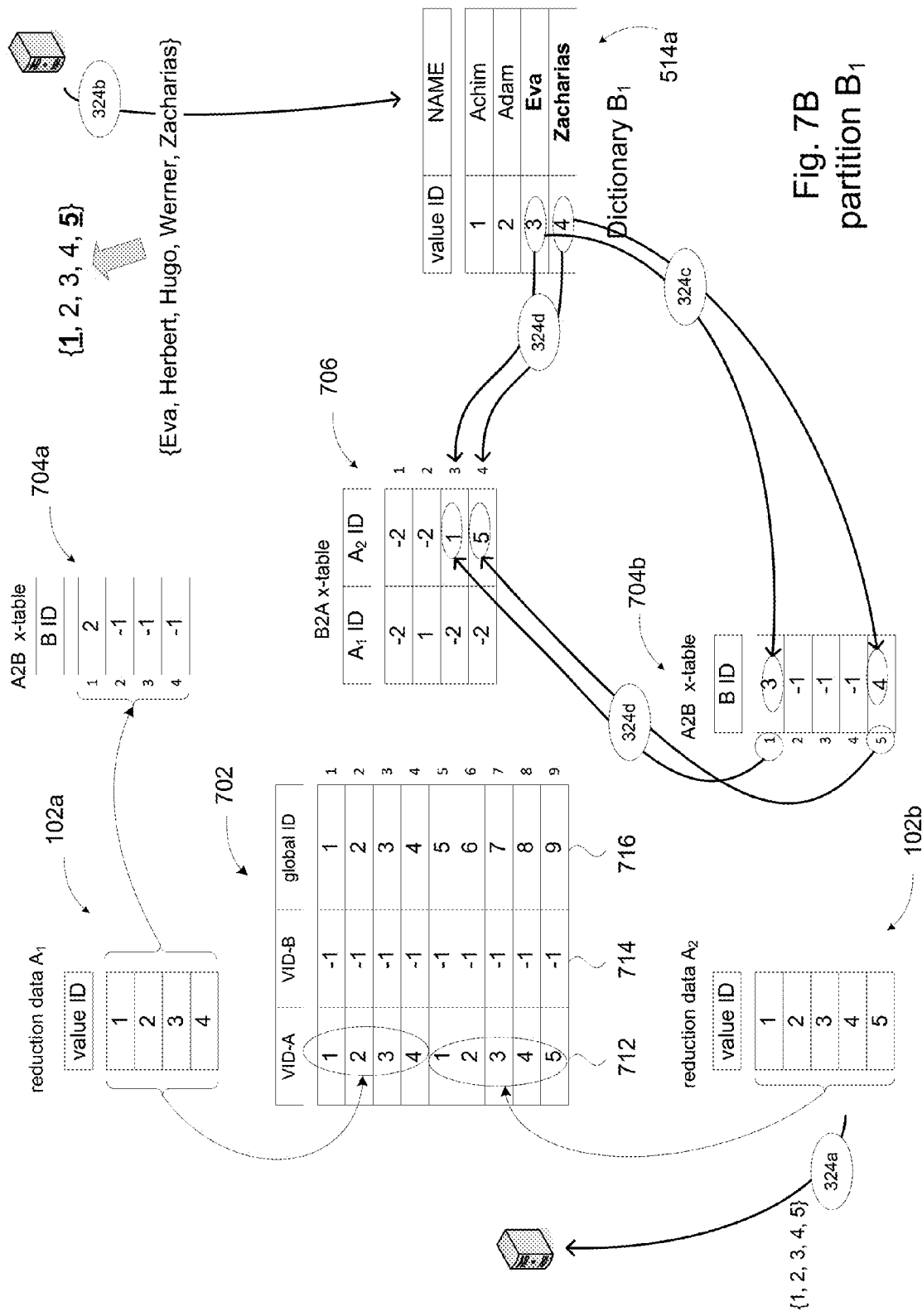

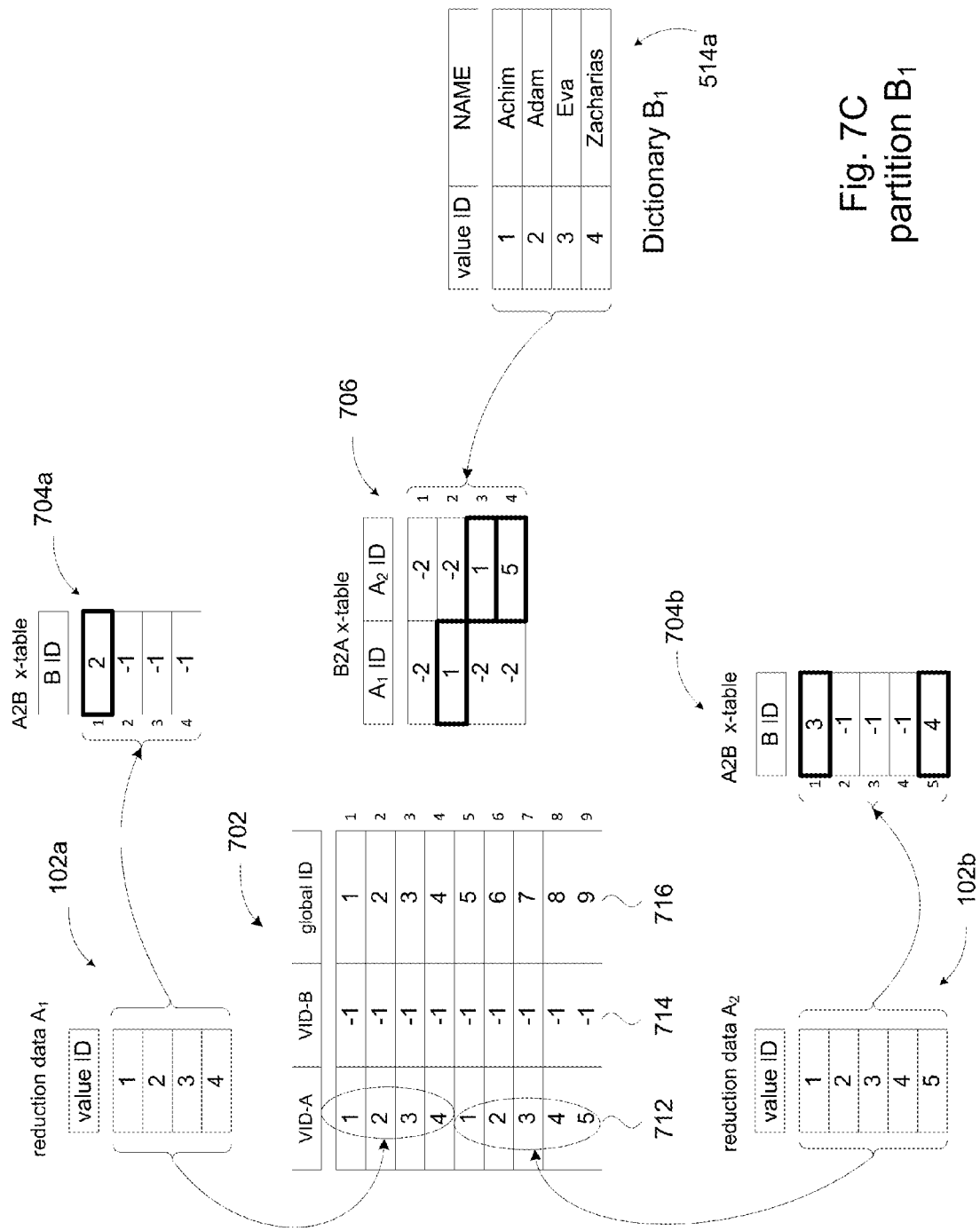

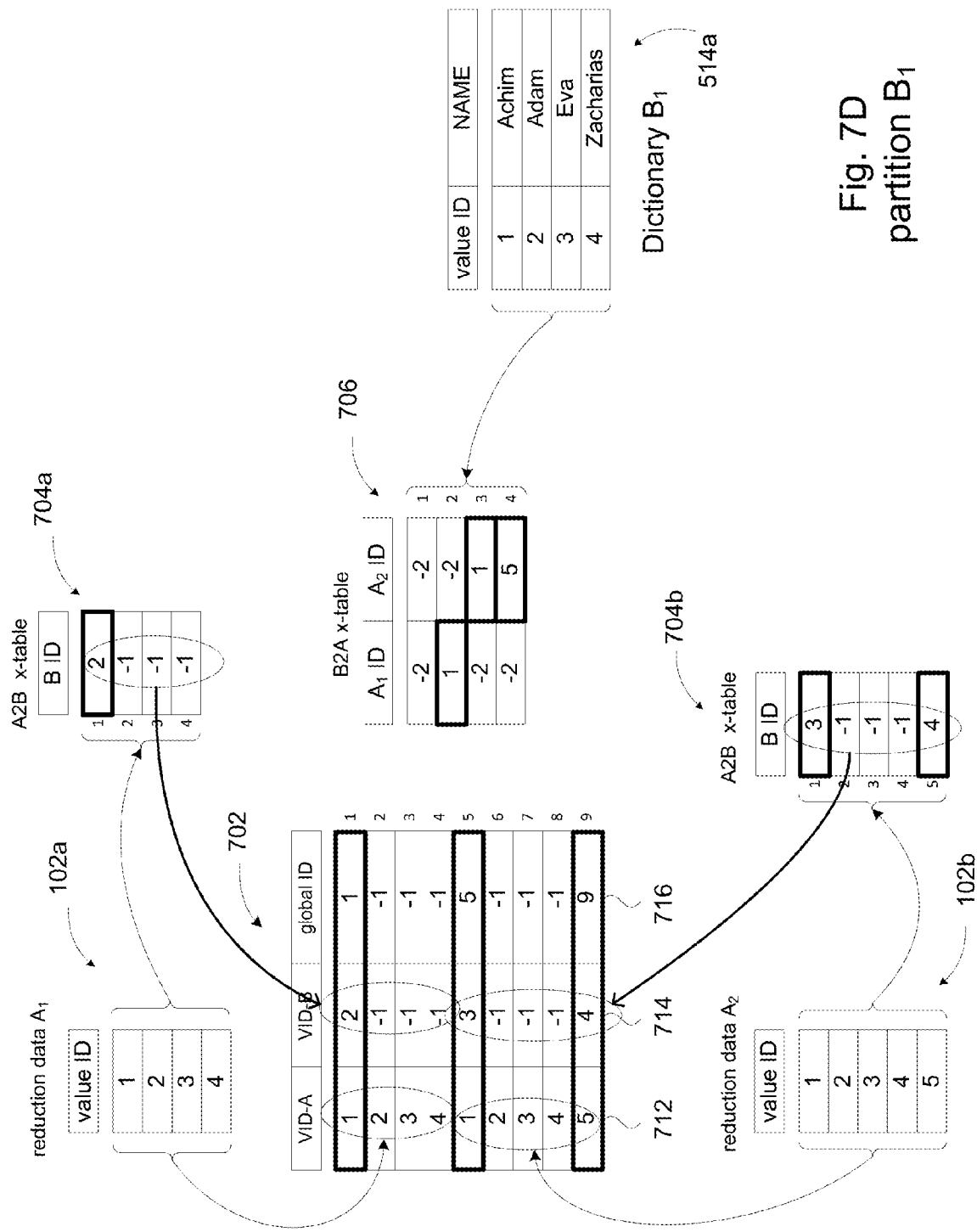
Fig. 7D partition B₁ partition $B_2$ partition $B_2$

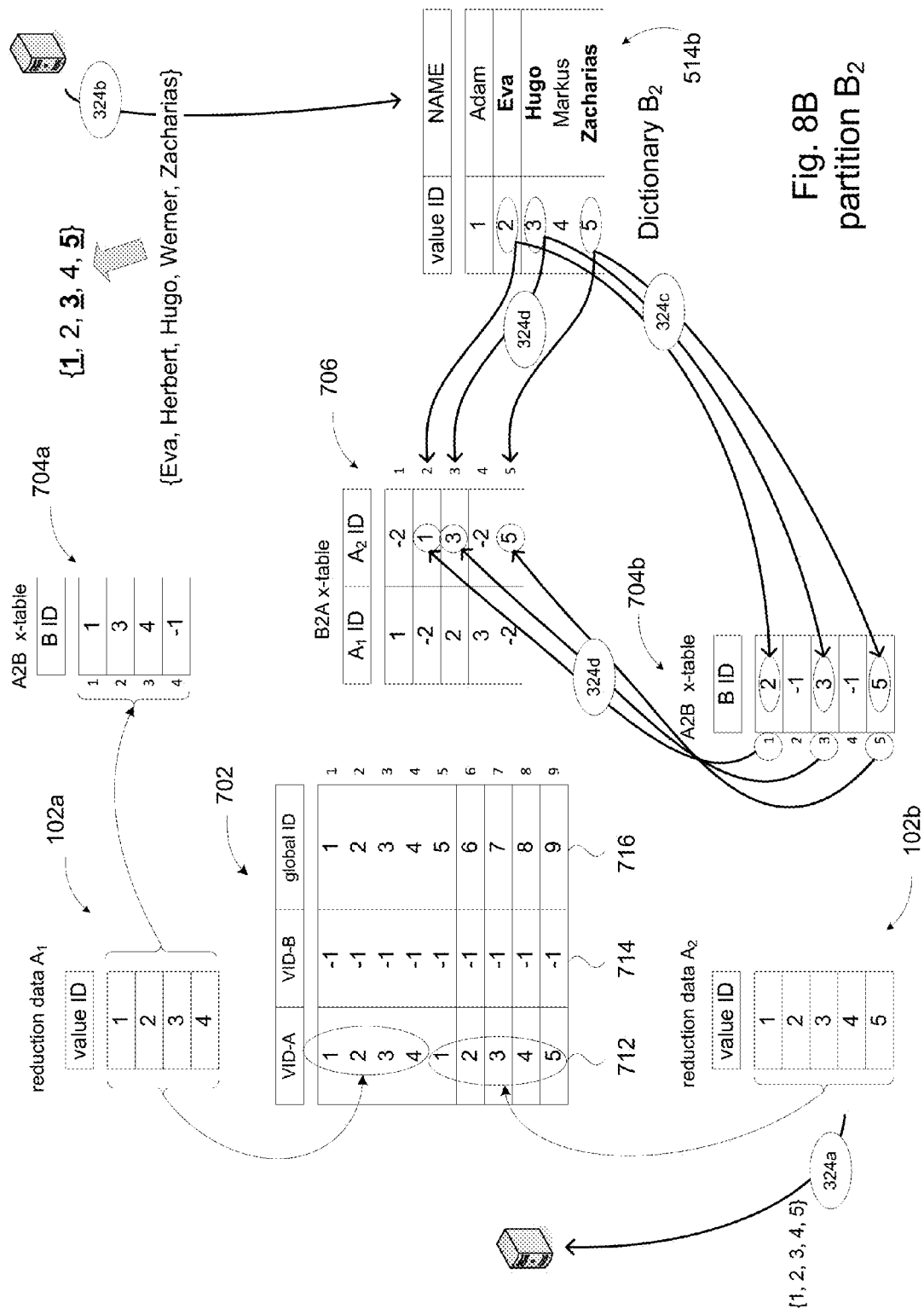
Fig. 8B partition $B_2$ partition B₂

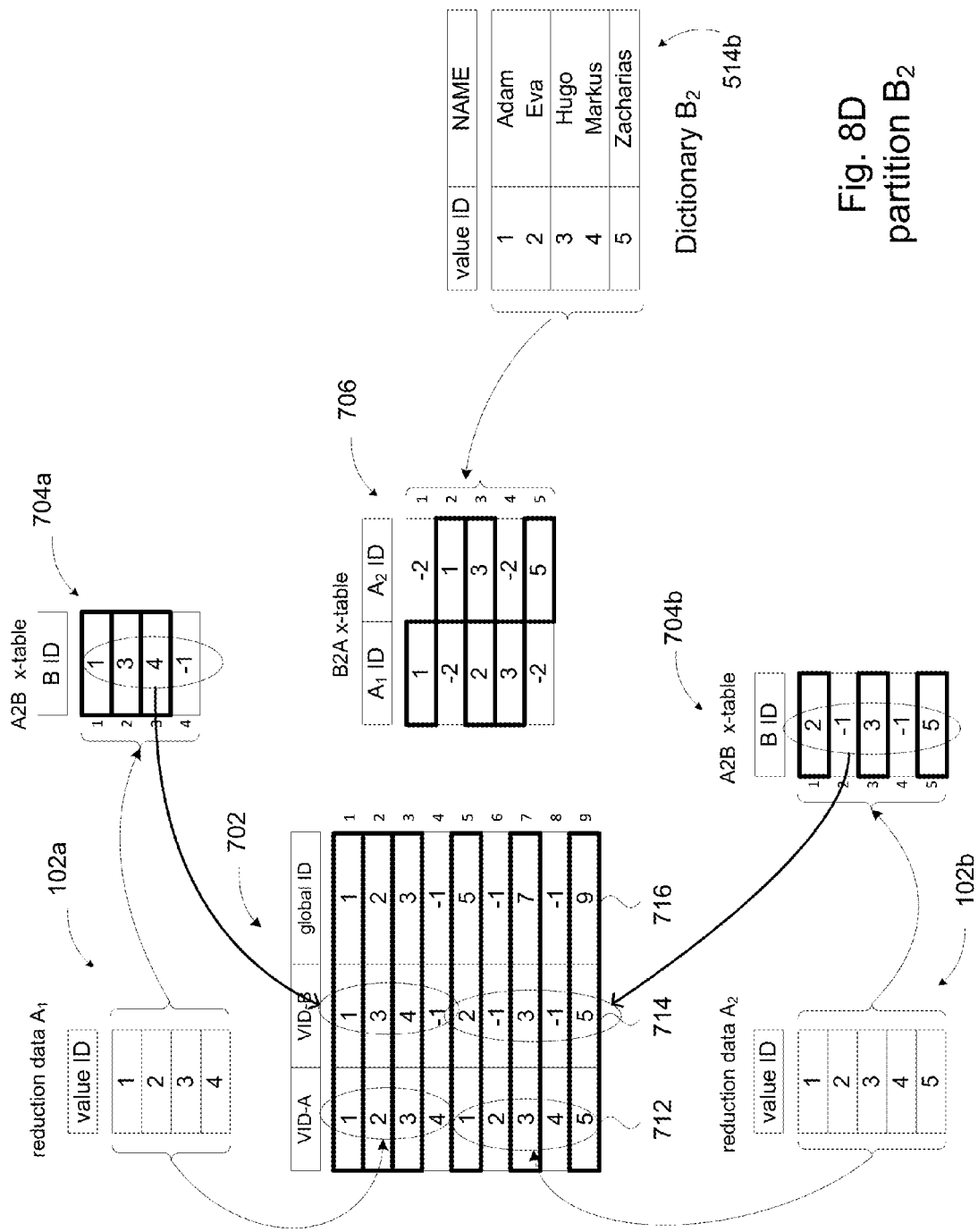

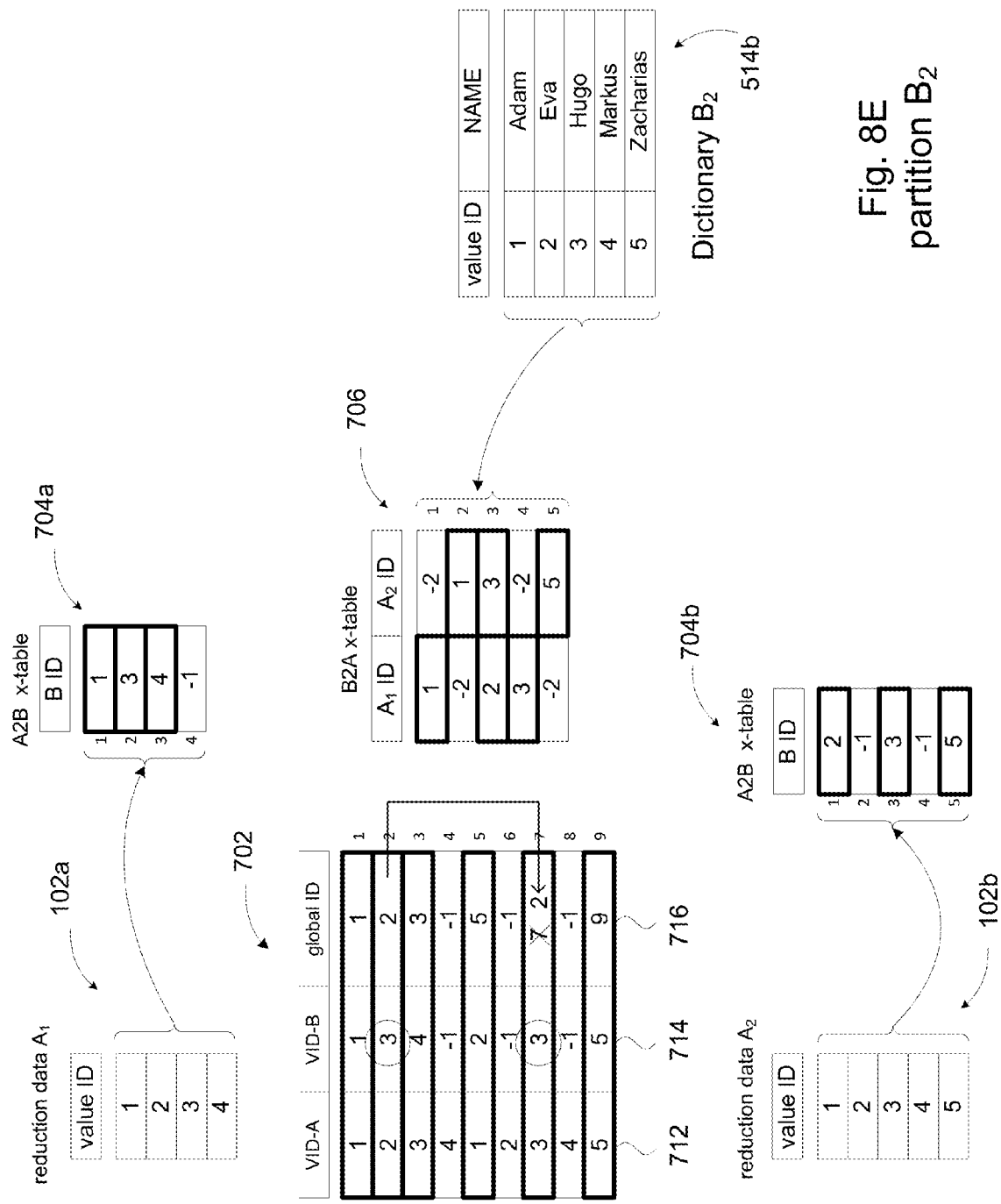
Fig. 8E partition B₂

702
translation matrix of partition B₁

| VID-A | VID-B | global ID |
|---|---|---|
| 1 | 2 | 1 |
| 2 | -1 | -1 |
| 3 | -1 | -1 |
| 4 | -1 | -1 |
| 1 | 3 | 5 |
| 2 | -1 | -1 |
| 3 | -1 | -1 |
| 4 | -1 | -1 |
| 5 | 4 | 9 |

712　714　716

Adam
Hugo
Markus

Eva

Hugo

Zacharias

702
translation matrix of partition B₂

| VID-A | VID-B | global ID |
|---|---|---|
| 1 | 1 | 1 |
| 2 | 3 | 2 |
| 3 | 4 | 3 |
| 4 | -1 | -1 |
| 1 | 2 | 5 |
| 2 | -1 | -1 |
| 3 | 3 | 2 |
| 4 | -1 | -1 |
| 5 | 5 | 9 |

712　714　716

B₁ partition

B₂ partition

Fig. 9

Inventory Table

| ID | Item | Quantity | Location |
|---|---|---|---|
| 1 | pants | 200 | 1st floor |
| 2 | shirts | 300 | 1st floor |
| 3 | toasters | 50 | 2nd floor |
| 4 | lamps | 75 | 3rd floor |

Fig. 14A

Mail-Order Table

| ID | Item | Sale Date | Quantity |
|---|---|---|---|
| 1 | shirts | 4/1/2009 | 2 |
| 2 | lamps | 6/23/2008 | 5 |
| 3 | lamps | 2/27/2011 | 1 |

Fig. 14B

| ID | Item | Quantity | Location | ID | Sale Date | Quantity |
|---|---|---|---|---|---|---|
| 2 | shirts | 300 | 1st floor | 1 | 4/1/2009 | 2 |
| 4 | lamps | 75 | 3rd floor | 2 | 6/23/2008 | 5 |
| 4 | lamps | 75 | 3rd floor | 3 | 2/27/2011 | 1 |

Fig. 14C

Inventory Table

| ID | Item | Quantity | Location |
|----|------|----------|----------|
| 1 | 2 | 200 | 1$^{st}$ floor |
| 2 | 3 | 300 | 1$^{st}$ floor |
| 3 | 4 | 50 | 2$^{nd}$ floor |
| 4 | 1 | 75 | 3$^{rd}$ floor |

Mail-Order Table

| ID | Item | Sale Date | Quantity |
|----|------|-----------|----------|
| 1 | 3 | 4/1/2009 | 2 |
| 2 | 1 | 6/23/2008 | 5 |
| 3 | 1 | 2/27/2011 | 1 | dictionary

| actual value | value ID |
|--------------|----------|
| lamps | 1 |
| pants | 2 |
| shirts | 3 |
| toasters | 4 |

Fig. 15

EQUI-JOINS BETWEEN SPLIT TABLES

CROSS-REFERENCE TO RELATED APPLICATIONS

This application is a continuation application and pursuant to 35 U.S.C. §120 is entitled to and claims the benefit of U.S. Pat. No. 9,135,282, which claims the benefit of U.S. Pat. No. 8,793,287, the content of both of which are incorporated herein by reference in their entireties for all purposes.

BACKGROUND

The present invention relates to database operations, and in particular to equi-join operations among split tables.

Unless otherwise indicated herein, the approaches described in this section are not prior art to the claims in this application and are not admitted to be prior art by inclusion in this section.

A common database operation in a relational database is the join operation. Generally, a join of two data sources creates an association of objects in one data source with objects that share a common attribute in another data source. A typical data structure for data sources is a data table (or simply, table) comprising rows and columns. Each row (or record) of the data table represents an object. Each column represents attributes of the object. For example, a data table may be defined for inventory in a retail store. The inventory items (e.g., pants, shirts, toasters, lamps, etc.) may constitute the objects represented by the data table. The attributes of each item may include such information as the name of the item, the number of items at that store, the location of the item in the store, and so on. Instances of an attribute are referred to as "attribute values", "actual values", or simply "values." An example of such a data table is shown in FIG. 14A, where each row 1402 represents a store item. Each row 1402 comprises attributes of the item columns 1404a-1404c. Each row 1402 may include an ID attribute 106 that identifies the row. For example, the ordinal position of a row 1402 in the data table may be used as the ID attribute.

FIG. 14B shows an example of another data table called Mail-Order. A join operation between the Inventory and Mail Order data tables can be performed. For example, consider a so-called "equi join" type of join operation where the join condition (join predicate) specifies a relationship (e.g., equality) between attributes that are common to both data tables. Suppose the join condition is: items in the Inventory data table that are the same as the items in the Mail-Order data table. For example, the join expression might be formulated as "Table Inventory inner join Table MailOrder on Inventory.Item=Mail-Order.Item".

An execution plan (query plan) for performing the join operation may include the following steps:
1. read out a row from the Inventory table
2. compare the actual value of the Item attribute in the row that was read out from the Inventory table with the actual value of the Item attribute in a row of the Mail-Order table
3. if there is a match, then output the row that was read out from the Inventory table and the matching row in the Mail-Order table
4. repeat steps 2 and 3 for each row in the Mail-Order table
5. repeat steps 1-4 for each row in the Inventory table A result of the join operation can be represented by the data table shown in FIG. 14C.

A database may comprise data tables that contain thousands of records each. In addition, records may have tens to hundreds of attributes each, and the actual values of some attributes may be lengthy (e.g., an attribute that represents the name of a person may require an allocation of 10-20 characters of storage space). Such databases can impose heavy requirements in the storage of their data. Accordingly, a practice of using dictionaries has arisen, where the actual values (e.g., 10-20 characters in length) of instances of an attribute in the data table are replaced by (or otherwise mapped to) an associated "value ID" (e.g., two or three bytes in length).

Consider the Inventory table and the Mail-Order table, for example. The actual values for instances of the Item attribute in the Inventory table include "pants", "shirts", "toasters", and "lamps". A dictionary can be defined for the Item attribute. For example, the dictionary may store the actual values of the Item attribute in alphabetical order and the value IDs that are associated with the actual values might be the ordinal position of the actual values in the dictionary.

An actual value in the data table is represented only once in the dictionary. For example, the actual value "lamps" occurs in twice in the Mail-Order table, but there is only one entry in the dictionary; thus, the dictionary might look like:

| |
|---|
| lamps |
| pants |
| shirts |
| toasters |

The value ID associated with the actual value "lamps" could be 1, being located in the first position in the dictionary. The value ID associated with the actual value "pants" could be 2, being the second position in the dictionary, and so on.

FIG. 15 shows the Inventory and Mail-Order tables of FIGS. 14A and 14B, modified by the use of a dictionary, more specifically a central dictionary. In particular, the actual values for instances of the Item attribute in the data tables (i.e., text) have been replaced by their corresponding associated value IDs (i.e., an integer). It can be appreciated that the use of dictionaries can reduce the storage burden of large databases.

The distribution of databases across separate database servers is commonly employed, for example, to distribute the storage burden across multiple sites. In a distributed database configuration, one or more constituent data tables of the database are partitioned (split) into some number of "partitions," and the partitions are distributed across many database servers. While the processing of certain queries in a distributed database configuration may be accomplished using only the data within a given partition of a data table, queries that involve a join operation require access to data from all of the partitions of the data tables being joined.

The execution plan of a join operation involving split (partitioned) data tables conventionally involves communicating the actual values of the attribute(s) specified in the join condition among the partitions in order to evaluate the join condition. One can appreciate that the execution plan may therefore entail a significant amount of data communication among the constituent partitions. As explained above, a dictionary can be used to reduce the space requirements for storing attribute values. Accordingly, each partition may be provided with its own local dictionary (rather than the central dictionary indicated in FIG. 15), the idea being that the associated value IDs can then be communicated among the partitions instead of the actual values.

However, the value IDs in a given local dictionary are generated independently of the values IDs in the other local dictionaries. In other words, value IDs locally generated in one partition of a data table may have no correlation to value IDs locally generated in another partition of that data table. Suppose, for example, the Item attribute is specified in a join condition. Suppose further that the actual value "pants" has a value ID of 2 in the local dictionary of one partition, a value ID of 7 in the local dictionary of another partition, and a value ID of 15 in yet another partition. The execution plan for the join operation may communicate the multiple different value IDs for "pants" (i.e., 2, 7, 15) among the partitions. However, the value IDs would be meaningless in any one partition for the join operation because value IDs only have meaning for the partition in which they were generated. For example, while the value ID 2 may be associated with "pants" in one partition, the value IDs 7 and 15 do not, and in fact very likely may be associated with completely different items; the value IDs could not be used to perform a join operation.

These and other issues are addressed by embodiments of the present invention, individually and collectively.

SUMMARY

In embodiments, a method for a join operation between a first data table and a second data table based on a first attribute of the first data table and a second attribute of the second data table may include receiving value IDs associated with a plurality of first partitions that comprise the first data table. The first partitions may be distributed among a plurality of first servers. For a given second partition among a plurality of second partitions that comprise the second data table, distributed among a plurality of second servers, one of the second servers may perform operations including: for each of the value IDs, identify a unique global ID associated with the value ID when the actual value represented by the value ID occurs among actual values comprising the second attribute of the second partition. For each identified unique global ID, pair the identified unique global ID with a document ID of a data record contained in a second partition stored at the second server in which the actual value in the data record is represented by the value ID associated with the identified unique global ID. A plurality of first globalized lists from one or more of the first partitions can be combined into a first compiled list. A plurality of second globalized lists from one or more of the second partitions can be combined into a second compiled list. The first and second compiled lists can then be joined based on global IDs in the first compiled list and the global IDs in the second compiled list.

In embodiments, a non-transitory computer readable storage medium having stored thereon computer executable program code, which when executed, may cause a computer processor in a first computer system to perform steps for a join operation between a first data table and a second data table based on a first attribute of the first data table and a second attribute of the second data table. The steps may include receiving value IDs associated with a plurality of first partitions that comprise the first data table. The first partitions may be distributed among a plurality of first servers. For a given second partition among a plurality of second partitions that comprise the second data table, distributed among a plurality of second servers, one of the second servers may perform operations including: for each of the value IDs, identify a unique global ID associated with the value ID when the actual value represented by the value ID occurs among actual values comprising the second attribute of the second partition. For each identified unique global ID, pair the identified unique global ID with a document ID of a data record contained in a second partition stored at the second server in which the actual value in the data record is represented by the value ID associated with the identified unique global ID. A plurality of first globalized lists from one or more of the first partitions can be combined into a first compiled list. A plurality of second globalized lists from one or more of the second partitions can be combined into a second compiled list. The first and second compiled lists can then be joined based on global IDs in the first compiled list and the global IDs in the second compiled list.

In embodiments, a first computer system may include a computer processor, a memory, and executable program code stored in the memory to perform a join operation between a first data table and a second data table based on a first attribute of the first data table and a second attribute of the second data table. The executable program code, which when executed by the computer processor, may cause the computer processor to receive value IDs associated with a plurality of first partitions that comprise the first data table. The first partitions may be distributed among a plurality of first servers. For a given second partition among a plurality of second partitions that comprise the second data table, distributed among a plurality of second servers, one of the second servers may perform operations including: for each of the value IDs, identify a unique global ID associated with the value ID when the actual value represented by the value ID occurs among actual values comprising the second attribute of the second partition. For each identified unique global ID, pair the identified unique global ID with a document ID of a data record contained in a second partition stored at the second server in which the actual value in the data record is represented by the value ID associated with the identified unique global ID. A plurality of first globalized lists from one or more of the first partitions can be combined into a first compiled list. A plurality of second globalized lists from one or more of the second partitions can be combined into a second compiled list. The first and second compiled lists can then be joined based on global IDs in the first compiled list and the global IDs in the second compiled list.

The following detailed description and accompanying drawings provide a better understanding of the nature and advantages of the present invention.

BRIEF DESCRIPTION OF THE DRAWINGS

FIG. 2 illustrates a system diagram that can incorporate embodiments of the present invention.

FIGS. 3 and 3A are process flows for processing among partitions in accordance with principles of the present invention.

FIG. 4 illustrates an example of data tables to facilitate an explanation of aspects of embodiments of the present invention.

FIG. 4A illustrates a join operation in a non-distributed configuration of the data tables of FIG. 4.

FIGS. 5 and 5A illustrate the data tables of FIG. 4 in a split and distributed configuration.

FIGS. 7 and 7A-7D illustrate data manipulations for a join operation in accordance with principles of the present invention, in one of the B partitions.

FIGS. 8 and 8A-8E illustrate data manipulations for a join operation in accordance with principles of the present invention, in another of the B partitions.

FIG. 9 compares the results of translation matrices from each B partition.

FIGS. 14A-14C and 15 illustrate some basic principles and examples of data tables.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
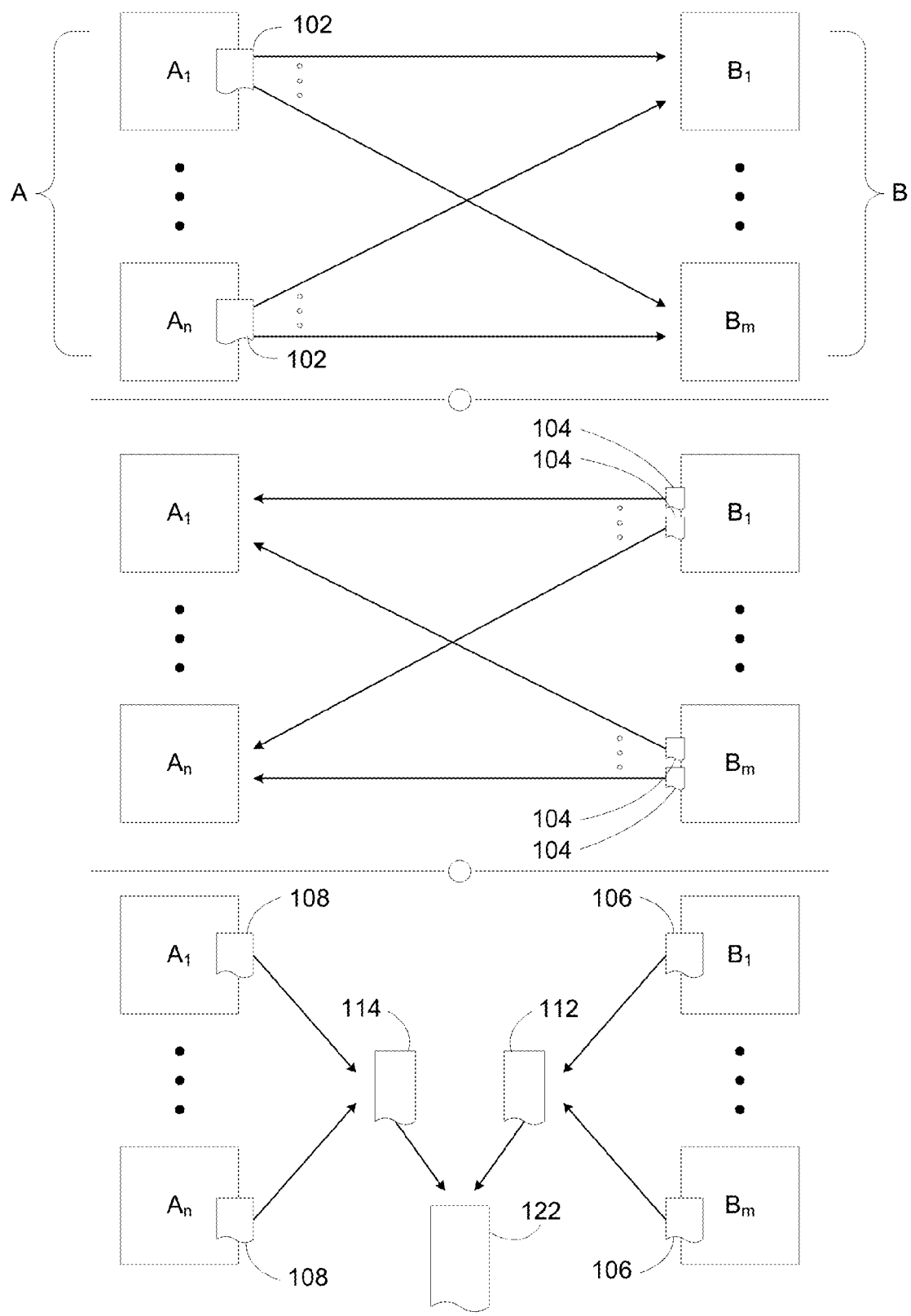
FIG. 1 represents a high level flow of data among database table partitions to conduct a join operation in accordance with principles of the present invention.

Aspects of the present invention relate to performing a join operation between two distributed data tables. In particular, an equi-join operation may be performed between data tables that are split into multiple distributed partitions. FIG. 1 is a high level view of an illustrative embodiment of the present invention. Partitions $A_1$-$A_n$, constitute N partitions of a data table A and can be distributed among some number (<=N) of data severs. For example, suppose data table A having 1000 rows (records) of data is split into four distributed partitions; partition $A_1$ might store a portion of the data table such as rows 1-200, partition $A_2$ might store rows 201-477 of the data table, partition $A_3$ might store rows 478-756, and partition $A_4$ might store rows 757-1000. Partitions $B_1$-$B_m$ similarly constitute M partitions of a split data table B that can be distributed among some number (<=M) of data servers. In accordance with embodiments, there are no restrictions relating to the distribution of partitions $A_1$-$A_n$ and $B_1$-$B_m$ among data servers (e.g., a data server may host partitions from data table A and from data table B), or to the number of data servers that are configured for hosting the partitions.

Referring to FIG. 2 for a moment, a typical computer system configuration in accordance with embodiments of the present invention is shown. In embodiments, a plurality of servers 210, 215, and 231-235 may host or otherwise store and maintain distributed partitions for one or more split data tables. For example, partition $A_1$ might be stored in server 210, partition $A_2$ might be stored in server 231, partition $B_1$ might be stored in server 234, and so on. For convenience, it is noted that the term "partition" can be used in several related contexts. The term "partition" may refer to the data that constitute a given portion of a data table, or to components of the storage system containing such data. The term "partition" may also refer generally to the server that is hosting the given portion of the data table, or to software employed to manipulate, maintain, and otherwise manage the data that constitute the given portion of the data table. It will be appreciated that the specific meaning of the term "partition" can be inferred from its usage and context.

Communication networks can connect the servers 210, 215, and 231-235. For example, a local network 220 may connect servers 210, 215. A publicly accessed network (e.g., the Internet) 230 may connect server 231-235. The local network 220 may be connected to the publicly accessed network 230, allowing communication among the database servers 210, 215, and 231-235.

Each server (e.g., 210) may include a data processor subsystem 201 that may comprise one or more data processing units. A memory subsystem 202 may comprise random access memory (usually volatile memory such as DRAM) and non-volatile memory such as FLASH memory, ROM, and so on. The memory subsystem 202 may store computer executable programs, which when executed can cause the data processing subsystem 201 to operate as a database system in accordance with aspects of the present invention disclosed herein. A storage subsystem 203 may comprise one or more mass storage devices such as hard disk drives and the like. The storage subsystem 203 may include remote storage systems; e.g., for data mirroring, remote backup and such. A network interface subsystem 204 can provide access to the local network 220 and provide users with access to the server 210. A system of buses 205 can interconnect the foregoing subsystems, providing control lines, data lines, and/or voltage supply lines to/from the various subsystems. The server 210 may include a suitable display(s) 212 and input devices 211 such as a keyboard and a mouse input device.

FIGS. 1 and 3 represent a high level flow of an execution plan for performing a join operation of two data tables A and B that are split and distributed, in accordance with aspects of the present invention. The join operation is predicated on a join condition that specifies an attribute(s) common to the two data tables A and B, which will be referred to as the "specified attribute". For example, consider an Inventory data table and a Sales data table; an attribute in the Inventory data table might be Stocked_Items and an attribute in the Sales data table might be Purchased_Items. A join operation between these two data tables might specify a join condition such as "Inventory.Stocked_hems=Sales.Purchased_Items". The Stocked_Items attribute would be the "specified attribute" in the Inventory data table, and the Purchased_Items attribute would be the "specified attribute" in the Sales data table.

Figure 1A:
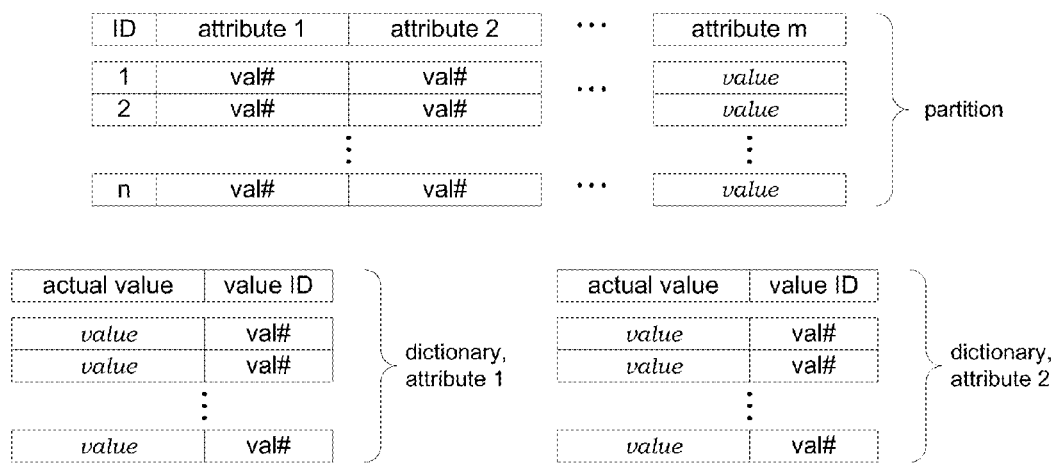
FIG. 1A show a general example of some details in a partition.

In embodiments, the two data tables A and B may be split into respective partitions $A_1$-$A_n$ and $B_1$-$B_m$. Referring for a moment to FIG. 1A, a generalized example of a data table partition is shown. The partition comprises n rows taken from a larger data table. Each row stored in the partition comprises m attributes. The partition may include one or more dictionaries, each corresponding to an attribute. For example, FIG. 1A shows that a dictionary is defined for attribute 1 and another dictionary is defined for attribute 2. The value IDs for attribute 1 and attribute 2, respectively, are stored in the partition rather than their associated actual values. As mentioned above, the dictionary(ies) in a given partition may be local to that partition. In other words, the value IDs stored in the dictionary(ies) of one partition may not correlate with the value IDs of dictionary(ies) of another partition, even though they may contain identical actual values.

Turning to the execution plan illustrated in FIG. 3, a brief overview of processing a join operation involving split (partitioned) data tables will be given. Reference will be made to partitioned data tables A and B illustrated in FIG. 1.

In a step 302, each partition $A_x$ among the partitions $A_1$-$A_n$ generates reduction data 102 and sends a copy of the generated reduction data to each partition $B_1$-$B_m$. Accordingly, each partition $B_1$-$B_m$ receives reduction data 102 from each partition $A_1$-$A_n$. In embodiments, the reduction data 102 for partition $A_x$ comprises value IDs associated with actual values of the specified attribute that occur in the partition. The step 302 can be performed by each partition $A_x$ independently of the other partitions $A_1$-$A_n$; there is no need to synchronize or otherwise coordinate their activity. In other words, individual reduction data 102 from each partition $A_1$-$A_n$ can be communicated to the partitions $B_1$-$B_m$ in parallel fashion.

In a step 304, each partition $B_x$ among the partitions $B_1$-$B_m$ associates a global ID for each actual value of the specified attribute in the partition that also occurs in at least one of the partitions $A_1$-$A_n$. In embodiments, the reduction data 102 received from the partitions $A_1$-$A_n$ can be used to perform this step. Multiple occurrences of a given actual value in the partition $B_x$ will be associated with the same global ID. In accordance with the present invention, occurrences of a given actual value among all the partitions of data table A and data table B can be associated with the same global ID. This aspect of the present invention will be discussed in more detail in connection with a specific example discussed below.

In a step 306, each partition $B_x$ among the partitions $B_1$-$B_m$ translates the value IDs that comprise the reduction data 102 from each partition $A_1$-$A_n$, producing a set of translated value IDs 104 for each partition $A_1$-$A_n$. Consider a partition $A_x$, for example. Translated value IDs 104 for partition $A_x$ are generated from the value IDs that comprise the reduction data 102 received from that partition. In particular, each value ID in the reduction data 102 is first associated with an actual value stored in the partition $A_x$. Next, if that actual value also occurs in the partition $B_x$, then the value ID is "translated" by pairing it with the global ID that is associated with that actual value. This translation is attempted for each value ID in the reduction data 102 of partition $A_x$. Accordingly, the translated value IDs 104 will comprise one or more values IDs that are paired with respective global IDs. Some value IDs in the reduction data 102 may be associated with actual values which do not occur in the partition $B_x$ and so no translation is made. The translated value IDs 104 are then sent to the partition $A_x$ (backward communication). This step is performed for each of the partitions $A_1$-$A_x$, and by each partition $B_1$-$B_m$. This aspect of the present invention will be discussed in more detail below.

In a step 308, each partition $B_x$ among the partitions $B_1$-$B_m$ generates a globalized list 106 that identifies one or more rows stored in the partition. Each row that is identified in the globalized list 106 contains an actual value of the specified attribute which also occurs in one of the partitions $A_1$-$A_N$ (based on the reduction data 102 as explained above). In an embodiment, the globalized list 106 may include a 2-tuple (a data pair) comprising a Doc ID and a global ID. The Doc IDs in the 2-tuples of the globalized list 106 identify specific rows in the partition $B_x$ for which the actual values of the specified attribute also occur in one of the partitions $A_1$-$A_n$. The global IDs in the 2-tuples are associated with those actual values. As a side note, the term "Doc ID" will be used herein to refer to an identifier that identifies a particular row in a data table. This aspect of the present invention will be made more clear in the specific example discussed below.

In embodiments, the globalized list 106 can be sent to a receiving (recipient) data server. For example, any data server 210, 215, 231-235 can be designated as the recipient data server. The recipient data server can be selected from among a population of candidate data servers in round-robin fashion, or selected randomly. In an embodiment, a particular data server can be designated as always being the recipient data server rather than employing a round robin selection process.

In a step 310, each partition $A_x$ among the partitions $A_1$-$A_n$ generates a globalized list 108 based on the translated value IDs 104 received from each of the partitions $B_1$-$B_m$. The globalized list 108 identifies one or more rows stored in the partition $A_x$. In an embodiment, the globalized list 108 includes a 2-tuple (a data pair) for each identified row. Each 2-tuple in turn comprises a Doc ID and a global ID. The Doc IDs identify one or more rows of the partition $A_x$. The global IDs are obtained from the translated value IDs 104 received from partitions $B_1$-$B_m$. In embodiments, the globalized list 108 identifies rows in partition $A_x$ for which actual values (represented by the global IDs) of the specified attribute also occur in one of the partitions $B_1$-$B_m$. This aspect of the present invention will be discussed in more detail below. The globalized list 108 can be sent to a recipient data server. In an embodiment, the recipient data server can be the same data server employed to receive globalized lists 106 from partitions $B_1$-$B_m$. In an embodiment, a different data server can be employed.

In a step 312, when the recipient data server has received all of the globalized lists 106 from partitions $B_1$-$B_m$, a compiled B list 112 can be created. The compiled B list 112 comprises pairs of Doc IDs and global IDs, and identifies those rows among partitions $B_1$-$B_m$ for which the actual values of the specified attribute also occur in at least one of the partitions $A_1$-$A_n$. Similarly, when the recipient data server has received all of the globalized lists 108 from partitions $A_1$-$A_n$, a compiled A list 114 can be created. The compiled A list 114 comprises pairs of Doc IDs and global IDs, and identifies those rows among partitions $A_1$-$A_n$ for which the actual values of the specified attribute also occur in at least one of the partitions $B_1$-$B_m$.

In a step 314, a join operation is performed between the compiled A list 114 and the compiled B list 112, where the join condition is based on the global ID attribute that is common to the compiled A list and the compiled B list. Since the global IDs are associated with actual values of the specified attribute, the join operation performed in this step is equivalent to the desired join operation between the specified attributes.

Following will be a more detailed discussion of the foregoing processing steps shown in FIG. 3, explained in connection with a particular example to facilitate further understanding of aspects of the present invention. Consider first the case of a join operation for non-partitioned data tables.

FIG. 4 shows two data tables, data table A 402 and data table B 404. Data table A specifies X attributes, where the first attribute is a Doc ID attribute and the second attribute is a Name attribute. Similarly, data table B specifies Y attributes also including a Doc ID attribute and a Name attribute. The Doc ID attribute identifies each row in a respective data table and so its actual values can be arbitrarily assigned so long as they serve to uniquely identify each row in that data table. Each data table A, B may have one or more dictionaries defined on their attributes in order to reduce data storage requirements.

Suppose a join operation is performed on the data tables A and B, predicated on the Name attribute in data table A being equal to the Name attribute in data table B. An execution plan for the join operation may involve generating an index on the Name attribute for each data table A and B. For example, FIG. 4A shows Index A 414 and Index B 412, represented as tables comprising the Doc ID attribute and the Name attribute. The figure shows a result 422 of the join operation, which is a table comprising a Doc ID A attribute and a Doc ID B attribute. The Doc IDs identify respective rows in data tables A and B that have the same actual values in their Name attribute.

Referring to FIGS. 5 and 5A, consider an example of the split configurations of the data tables A and B shown in FIG. 4. FIG. 5 shows data table A having been partitioned into partitions $A_1$, $A_2$ (502a, 502b) and data table B being partitioned into partitions $B_1$, $B_2$ (504a, 504b). FIG. 5A shows dictionaries 512a, 512, b, 514a, 514b for the Name attribute in each respective partition $A_1$, $A_2$, $B_1$, and $B_2$, one dictionary being defined for each partition. Each occurrence of an actual value of the Name attribute in a partition has an entry in its respective dictionary and is associated with a value ID. Note that the value IDs among the dictionaries are not related. For example, value ID 2 in dictionary $A_1$ is associated with the actual value "Hugo", while the same value ID in dictionary $A_2$ is associated with the actual value "Herbert". FIG. 5 shows the value IDs associated with the actual values of the Name attribute for each partition $A_1$, $A_2$, $B_1$, and $B_2$, obtained from the dictionaries of FIG. 5A. Though the value IDs in a given dictionary can be arbitrarily selected (so long as they uniquely identify an actual value and the actual value is uniquely identified by the value ID), embodiments of the present invention may adopt the convention that the value IDs be the ordinal positions in the dictionary of their corresponding actual values. Accordingly, the value IDs are consecutive, beginning with "1".

Consider now the join operation discussed above in connection with FIG. 4, namely a join operation of the split data tables A and B of FIG. 5 predicated on the Name attribute in data table A being equal to the Name attribute in data table B (the join condition). The execution plan shown in FIG. 3 for conducting a join operation in accordance with the present invention will now be explained in the context of the specific example illustrated in FIGS. 5 and 5A. For the discussion that follows, references to "actual value" will be understood to refer to actual values of the Name attribute (the specified attribute) in data table A or in data table B.

Step 302—Generate and Send Reduction Data

Figure 6:
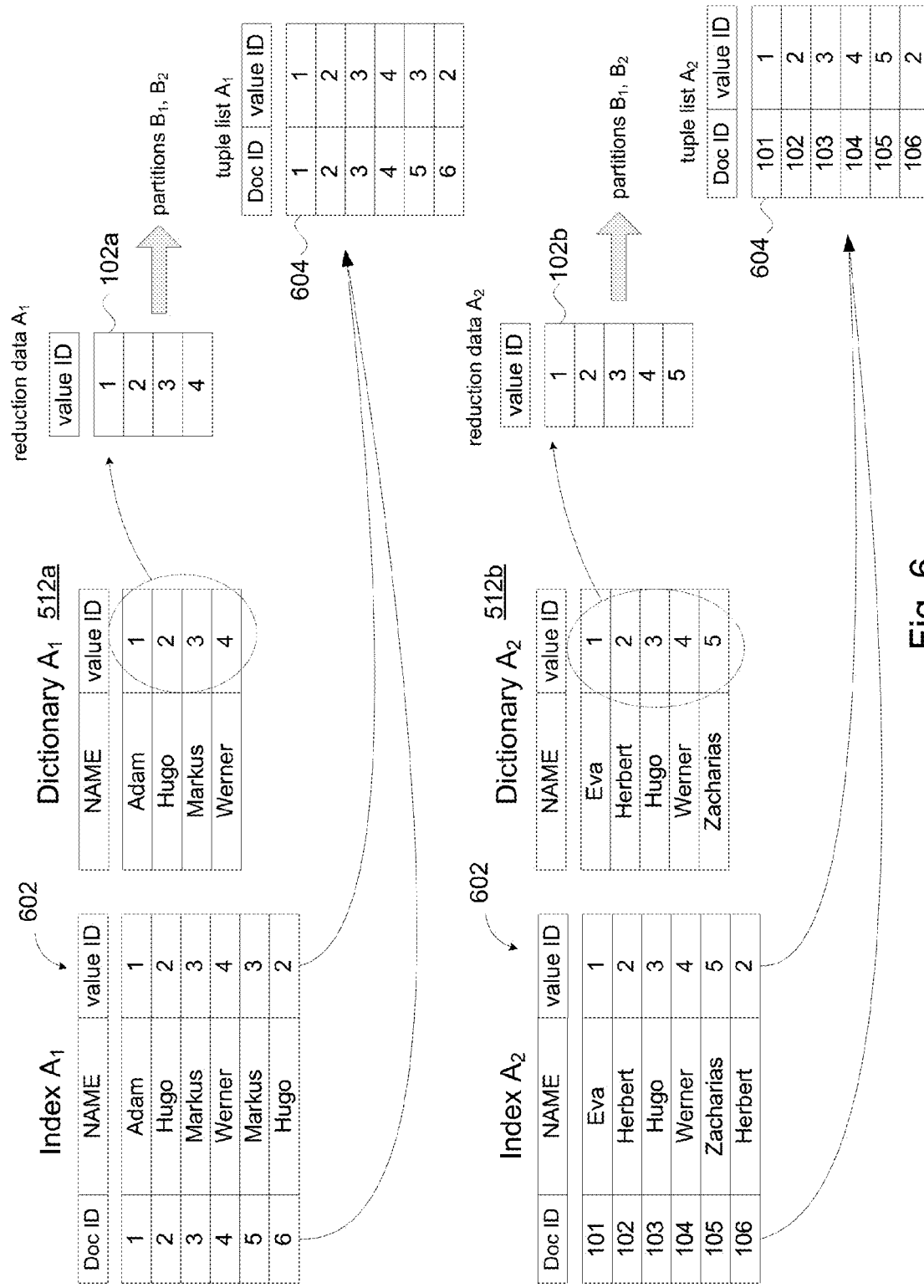
FIG. 6 illustrates some processing in each A partition.

Referring to FIG. 6, each partition $A_1$, $A_2$ generates and sends respective reduction data 102a, 102b to partitions $B_1$, $B_2$. The reduction data 102a, 102b can be obtained from the local dictionary of the respective partition. For example, the reduction data 102a from partition $A_1$ is communicated to each partition $B_1$, $B_2$. Likewise, the reduction data 102a from partition $A_2$ is communicated to each partition $B_1$, $B_2$. In a particular embodiment, an index table 602 can be created in each partition $A_1$, $A_2$. Each index table 602 comprises the Doc ID attribute and the Name attribute obtained from the respective partition, and a value ID attribute obtained from the partition's local dictionary. A tuple list 604 comprising Doc IDs and initially populated with corresponding value IDs can be generated and stored in the respective partition. The significance of table 602 and list 604 will become clear later on.

Step 304—Associate Global IDs

Each partition $B_1$, $B_2$ associates a global ID for each actual value of the Name attribute in the partition that also occurs in at least one of the partitions $A_1$, $A_2$. Referring to FIGS. 3A, 7, and 7A-7D, consider first the processing in partition $B_1$. Processing in partition $B_2$ will be discussed in connection with FIGS. 8 and 8A-8D.

Figure 7:
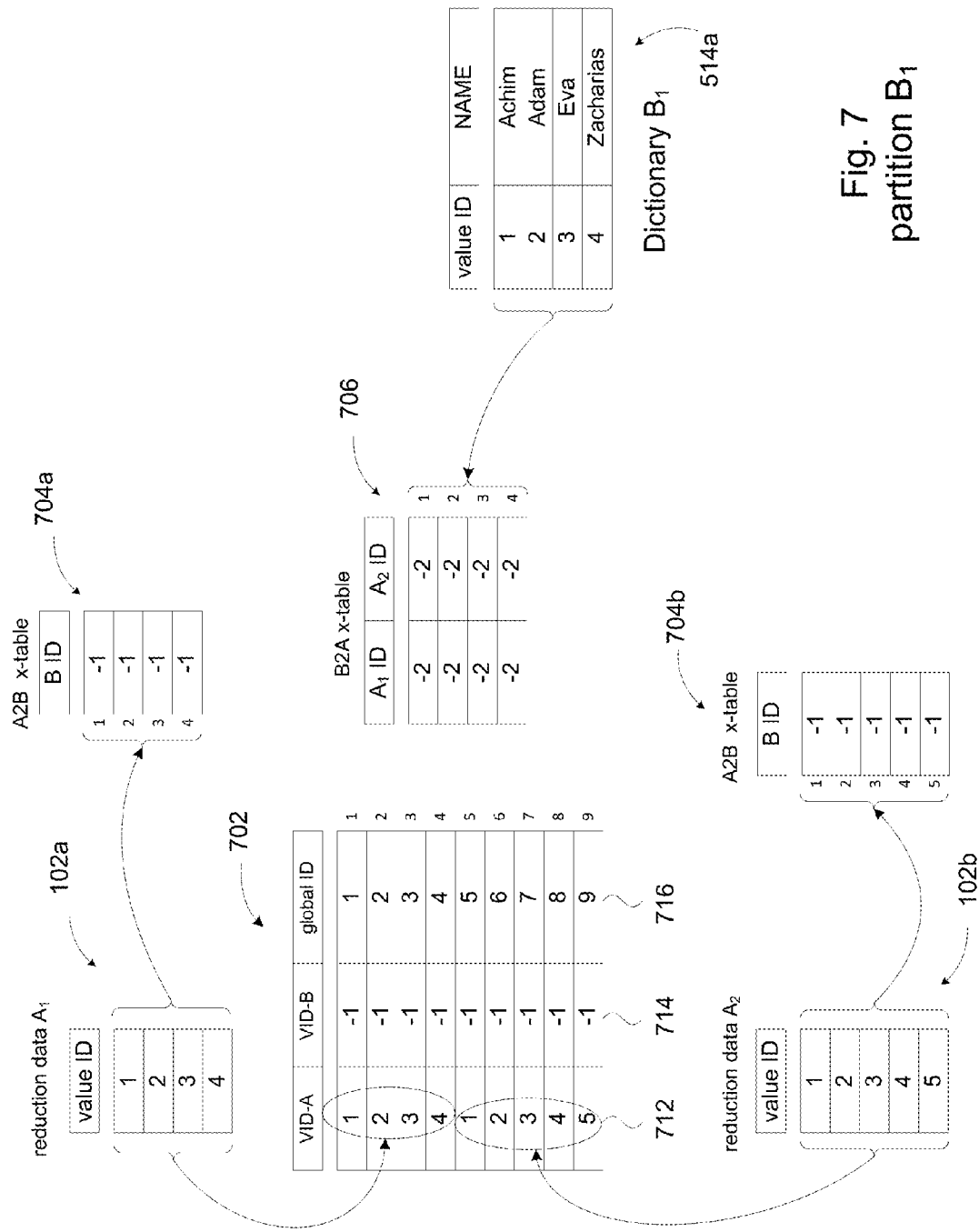

In a step 322, various tables can be created and initialized in partition $B_1$. In an embodiment, these tables are local to partition $B_1$. FIG. 7 shows the reduction data 102a, 102b received in partition $B_1$ from partitions $A_1$, $A_2$. In embodiments, the reduction data 102a, 102b may be incorporated into a translation matrix 702 local to partition $B_1$. The value IDs in the reduction data 102a, 102b may be assembled into a VID-A column 712. A VID-B column 714 is initialized to "−1"; this column will be filled in with value IDs from the local dictionary of partition $B_1$.

The translation matrix 702 includes a global ID column 716 which is initialized with its corresponding ordinal position in the translation matrix. In general, any set of numbers can be used to initialize the global ID column 716 so long as each row has a unique number and the same set of numbers is used by each of the partitions $B_1$, $B_2$. Initially, the value IDs 1, 2, 3, and 4 from partition $A_1$ are initially mapped to global IDs 1, 2, 3, and 4 (namely rows 1-4 of the translation matrix 702); and the value IDs 1, 2, 3, 4, and 5 from partition $A_2$ are initially mapped to global IDs 5, 6, 7, 8, and 9 (rows 5-9 of the translation matrix).

Additional tables are created and initialized. An A2B translation table is created for each partition $A_x$, and initialized to "−1". For example, partition $A_1$ has a corresponding A2B translation table 704a and partition $A_2$ has a corresponding A2B translation table 704b. The translation tables 704a, 704b serve to translate the value IDs from partitions $A_1$ and $A_2$ to corresponding value IDs in partition $B_1$. Since the respective value IDs for $A_1$, $A_2$ are consecutive by convention, the value IDs correspond directly with the row indices in tables 704a, 704b. For example, the value ID "3" for partition $A_1$ can be used to index into translation table 704a to obtain the translated value ID in partition $B_1$. This use of the indices is illustrated in FIG. 7.

A B2A translation table is created and initialized with "−2". The partition $B_1$ has a corresponding B2A translation table 706 which includes a corresponding column for each partition $A_x$. The B2A translation table 706 serves to provide a translation of the value IDs in the local dictionary of partition $B_1$ to corresponding value IDs in partitions $A_1$, $A_2$. Since the value IDs are consecutive, the row in table 706 for a given value ID can be accessed using the value ID itself as an index into the table.

Figure 7A:
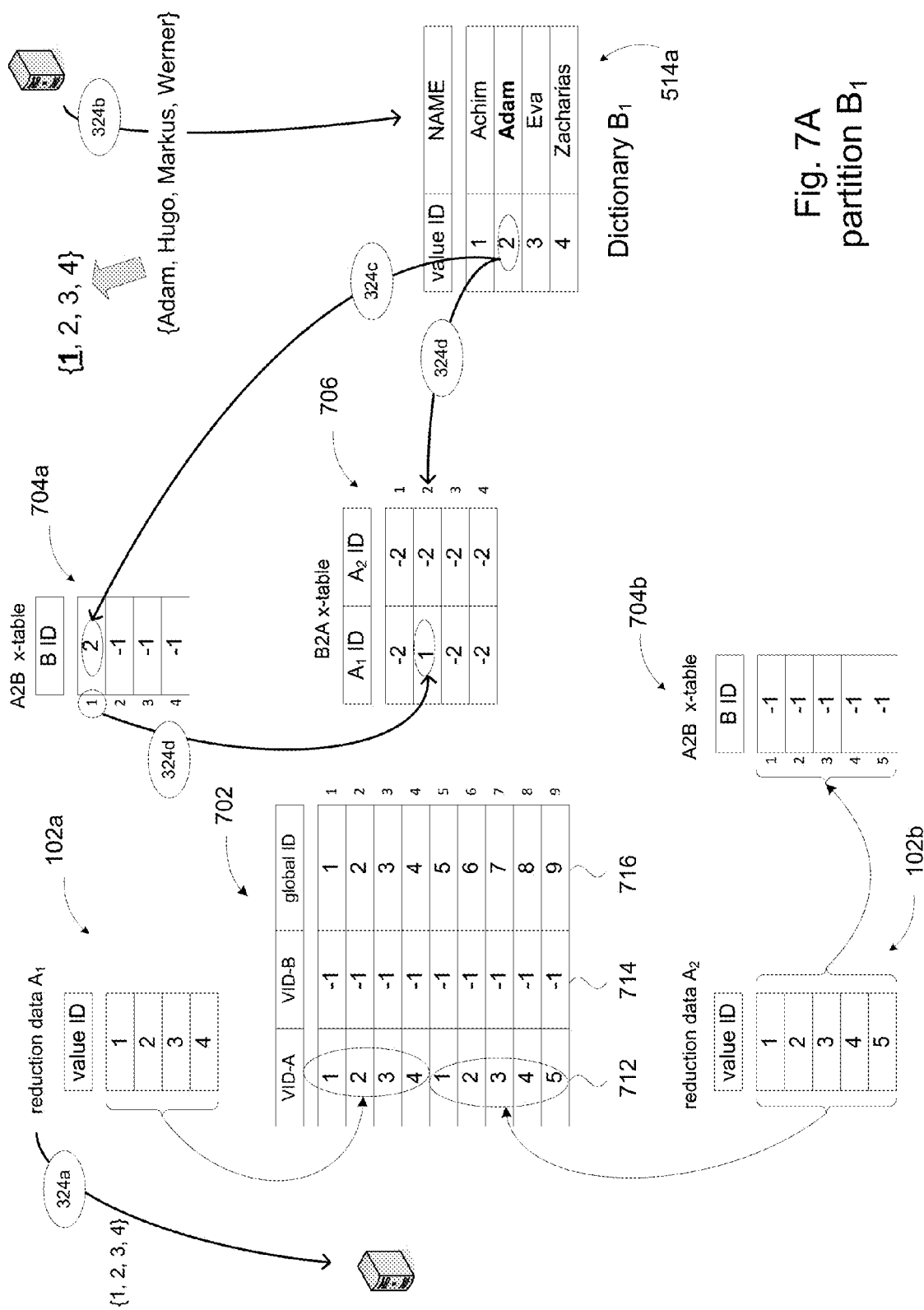

Continuing with FIG. 3A and referring now to FIGS. 7A-7C, the translation tables 704a, 704b, 706 can be filled in the following manner: Consider first FIG. 7A and partition $A_1$. In a step 324a, the value IDs from the corresponding reduction data 102a are sent to and received by the server that hosts partition $A_1$. For example, FIG. 7A shows the list of value IDs {1, 2, 3, 4} being sent to the server. The actual values corresponding to the list of value IDs are obtained from the local dictionary of partition $A_1$ (see FIG. 5A) and are sent by and received from the server in a step 324b. For example, the list of actual values received is {Adam, Hugo, Markus, Werner}. In a step 324c, if an actual value received from partition $A_1$ matches an entry in the local dictionary for partition $B_1$, then the value ID from $B_1$'s local dictionary is copied to the corresponding entry in the A2B translation table 704a. As explained above, the $A_1$ value IDs can be used to index into the table 704a. Conversely, in a step 324d, partition $A_1$'s value ID for that matching actual value is copied into the B2A translation table 706 indexed by the value ID from $B_1$'s local dictionary. FIG. 7A is annotated with steps 324a-324d to illustrate this process.

Steps 324a-324d are performed 324 by each partition $A_x$. For example, FIG. 7B shows steps 324a-324d performed for partition $A_2$. Since each partition $A_x$ operates independently of each other, they can perform these steps at the same time. FIG. 7C shows the result after each of the partitions have completed steps 324a-324d.

It can be appreciated from the foregoing that the "−1" values in the A2B translation tables 704a, 704b indicate that there is no translation of value IDs from the respective $A_1$, $A_2$, partitions to the $B_1$ partition. Consider translation table 704a for partition $A_1$, for example. The second entry corresponds to a value ID 2 in partition $A_1$, which in turn corresponds to the value "Hugo". Since the local dictionary for partition $B_1$ does not have an entry for "Hugo", the entry in table 704a remains unchanged, namely it is "−1".

It can be further appreciated that the "−2" values in the B2A translation table 706 indicates that the partition $B_1$ has not yet received the corresponding value from the respective the $A_x$ partition. For example, consider the first entry in the $A_1$ ID column of the table 706. This entry corresponds to the first entry in the local dictionary for partition $B_1$, which contains the value "Achim". Since the local dictionary for partition $A_1$ (see FIG. 5A) does not include the value "Achim", partition $B_1$ did not receive such value from partition $A_1$, and so the entry in table 706 remains unchanged, namely it is "−2". Previously communicated values can be locally cached in the B2A translation table 706 for subsequent join operations, thus avoiding redundant communications. Thus, for subsequent join operations involving data table A, only those entries that have "−2" may need to be filled with actual values.

Continuing with FIGS. 3A and 7D, in a step 326 the A2B translation tables 704a, 704b are mapped into their respective entries in the VID-B column 714 of the translation matrix 702. FIG. 7D shows the result of such mapping, the values are copied from the translation tables 704a, 704b into column 714. In this way, the global IDs in column 716 become associated with actual values via the value IDs in columns 712 and 714. For example, the value ID of 1 from partition $A_1$ is associated with "Adam" and so the global ID "1" is associated with "Adam." Similarly, global ID "5" is associated with "Eva."

For entries in the tables 704a, 704b which have no translation to corresponding value IDs in partition $B_1$, the corresponding global IDs in column 716 are changed to "−1" to indicate this fact. Thus, for example, value IDs 2, 3, and 4 in partition $A_1$ have no corresponding value IDs in partition $B_1$, and so the global IDs in rows 2, 3, and 4 of the translation matrix 702 are set to "−1". Similarly, value IDs 2, 3, and 4 in partition $A_2$ have no corresponding value IDs in partition $B_1$, and so the global IDs in rows 6, 7, and 8 of the translation matrix 702 are set to "−1".

In a step 328, any duplicate VID-B values in column 714 would be handled in the following manner: For each VID-B value in column 714 that occurs more than once, copy the global ID (column 716) associated with the first occurrence of that VID-B value into the global ID column of each duplicated VID-B value. However, the translation matrix 702 shown in FIG. 7D for partition $B_1$ does not have any duplicated VID-B values. For example, the values 2, 3, and 4 each occurs only once in column 714, and so their corresponding global IDs remain unchanged, namely 1, 5, 9 respectively. This is not the case in partition $B_2$, and the processing of step 328 is illustrated below for partition $B_2$.

Figure 8:
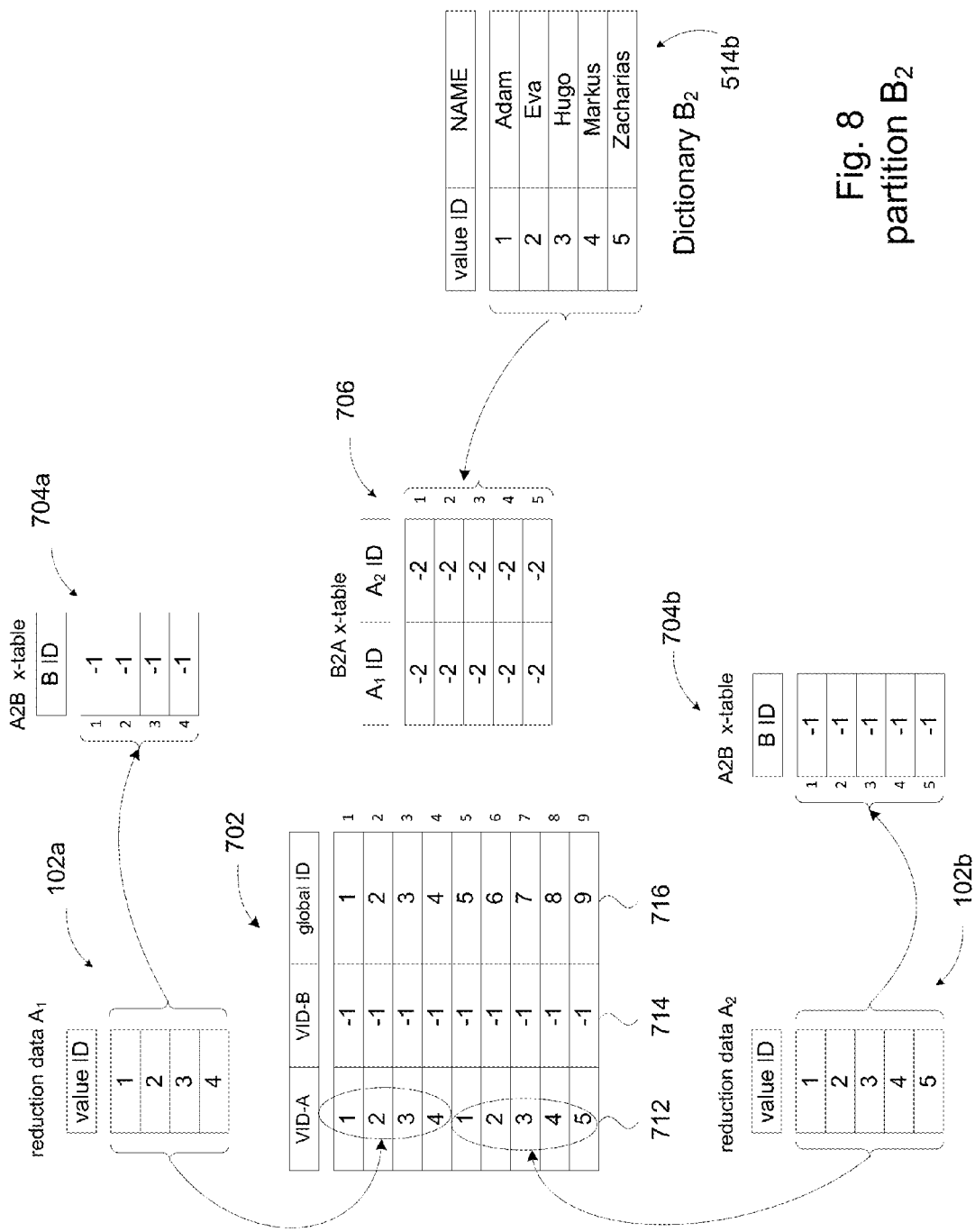

Refer now to FIGS. 3A, 8, and 8A-8D for a brief discussion of the processing (step 304) of partition $B_2$ in accordance with embodiments of the present invention. Thus, in a step 322, various tables local to partition $B_2$ can be created and initialized in the partition. FIG. 8 shows the reduction data 102a, 102b received in partition $B_2$ from partitions $A_1$, $A_2$. In embodiments, the reduction data 102a, 102b may be incorporated into a translation matrix 702 that is local to partition $B_2$. The VID-A column 712, VID-B column 714, and global ID column 716 are initialized in the same manner as explained in FIG. 7 for partition $B_1$. Likewise, the additional tables 704a, 704b, and 706 are initialized in the same manner as described in FIG. 7 for partition $B_1$. The B2A translation table 706 for partition $B_1$ in FIG. 7 contains four entries because $B_1$'s local dictionary has four items. However, since $B_2$'s local dictionary has five items, the B2A translation table 706 in FIG. 8 has five entries.

Figure 8A:
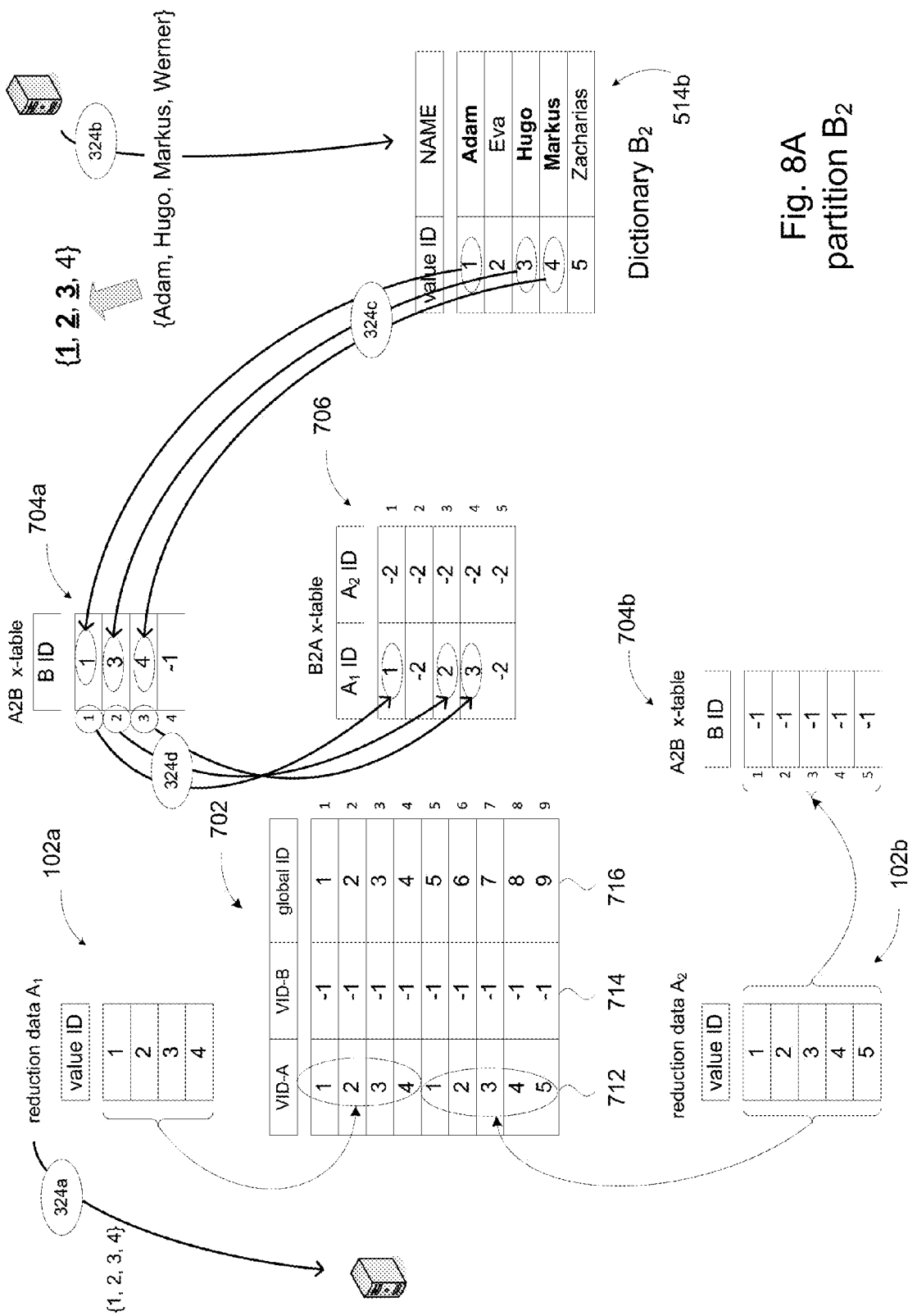

Referring now to FIG. 8A, processing of steps 324a-324d between partition $B_2$ and $A_1$ is illustrated. The list of value IDs for partition $A_1$ is sent to the server hosting the $A_1$ partition (324a). The list of values corresponding to the value IDs is received from the server (324b). In step 324c, the received list of values {Adam, Hugo, Markus, Werner} is used to map the $A_1$ value IDs to the $B_2$ value IDs, thus filling in the A2B translation table 704a for $A_1$. In step 324d, a similar mapping is made to map the $B_2$ value IDs to the $A_1$ value IDs, thus filling in the $A_1$ ID column in the translation table 706 for partition $B_2$.

Figure 8C:
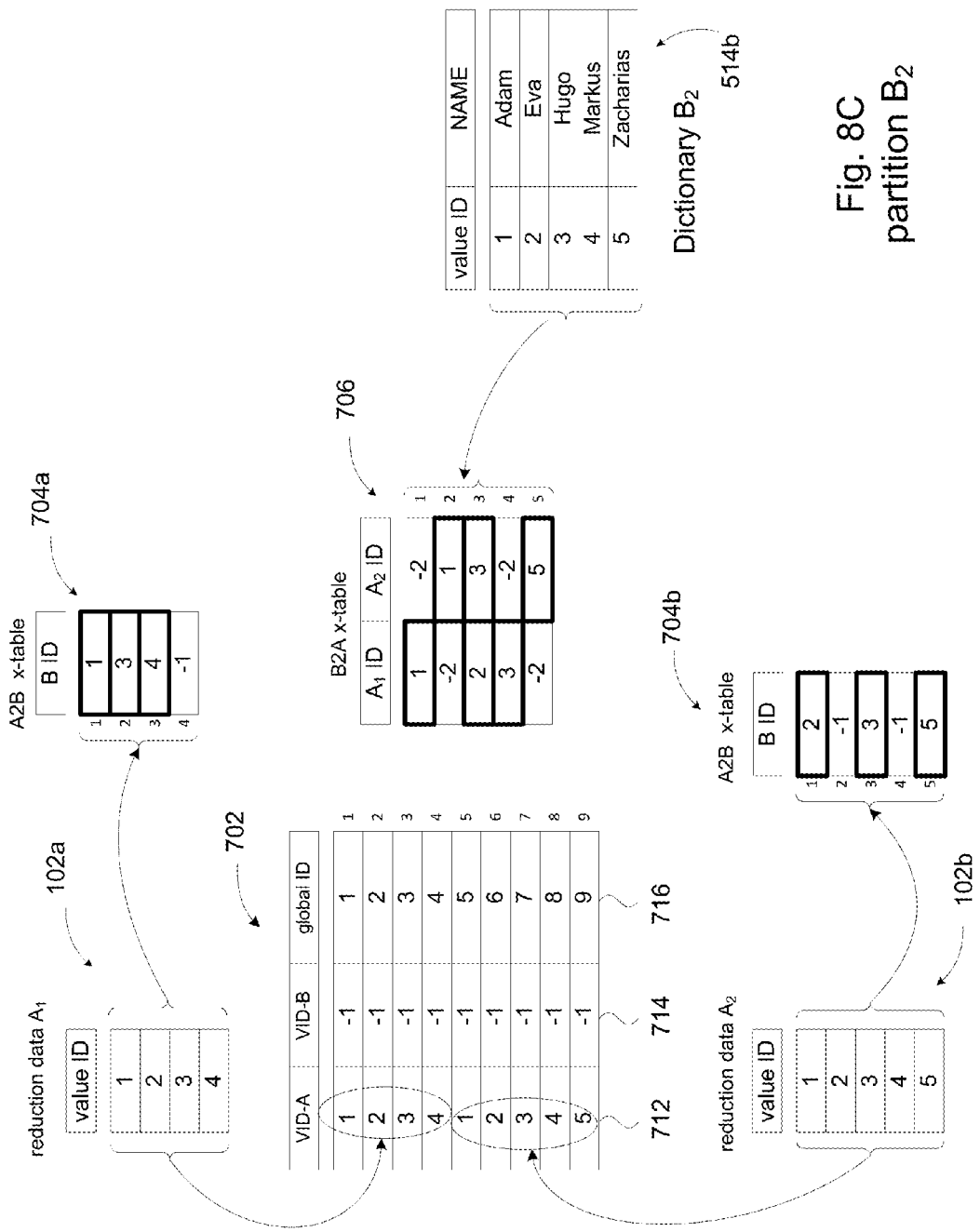

Referring to FIG. 8B, the processing of steps 324a-324d between partition $B_2$ and $A_2$ is illustrated. FIG. 8C show shows the result upon completion of loop 324. In step 326, the A2B translation tables 704a, 704b are mapped into their respective entries in the VID-B column 714 of the translation matrix 702. FIG. 8D shows the result of such mapping, the values are copied from the translation tables 704a, 704b into column 714.

In step 328, duplicate VID-B values in column 714 of the translation matrix 702 for partition $B_2$ are handled in the following manner: For each VID-B value in column 714 that occurs more than once, copy the global ID (column 716) associated with the first occurrence of that VID-B value into the global ID column of each duplicated VID-B value. Referring to FIG. 8E, The VID-B value of "3" appears twice. The first occurrence is associated with the global ID "2". Accordingly, the global ID value "2" is copied into the global ID column of each duplicate occurrence of "3" in the VID-B column 714.

This concludes the discussion of step 304 (FIG. 3) for partitions $B_1$ and $B_2$. FIG. 9 shows the translation matrices 702 that are stored in each partition $B_1$, $B_2$ at this point. A few observations are worth mentioning. Processing in accordance with embodiments of the present invention in partitions $B_1$, $B_2$ occurs independently of each other; there is no synchronization of their data or other communications. The resulting translation matrix 702 in a given partition contains global IDs that identify actual values (of the specified attribute in the join operation) in the given partition which also occur in at least one of the partitions $A_1$, $A_2$. Consider for example the value "Hugo" in FIG. 9. "Hugo" appears in partition $B_1$ and in partition $A_1$, so "Hugo" is assigned a global ID (in this case 3). On the other hand "Achim" in partition $B_1$ does not appear in either partition $A_1$ or $A_2$. Accordingly, none of the translation tables 702 have a translation for "Achim". The global IDs are unique among the translation tables 702 for a given actual value. For example, "Hugo" appears in partitions $B_1$ and $B_2$. The translation matrices 702 in each partition $B_1$, $B_2$ map "Hugo" to the same global ID, namely "2".

The discussion will now continue with an explanation of the remaining steps 306-312 of FIG. 3.

Step 306—Send Translated Value IDs

Figure 10A:
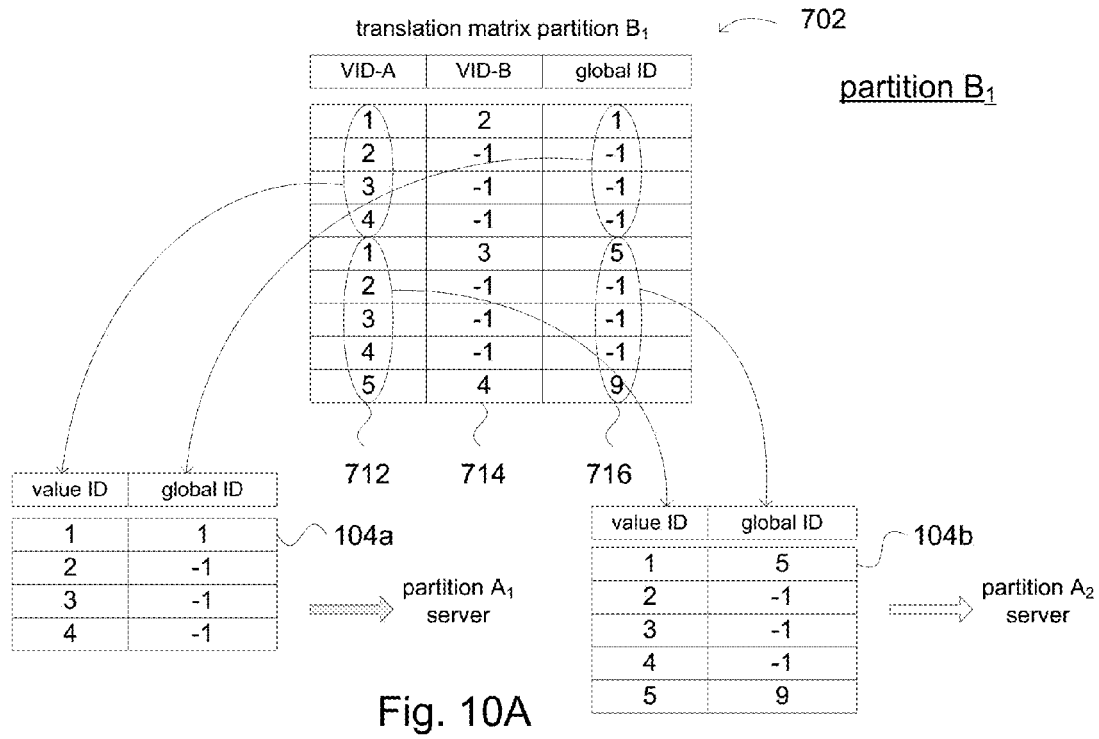
FIGS. 10A and 10B illustrate generating value ID lists in accordance with embodiments of the present invention.
Figure 10B:
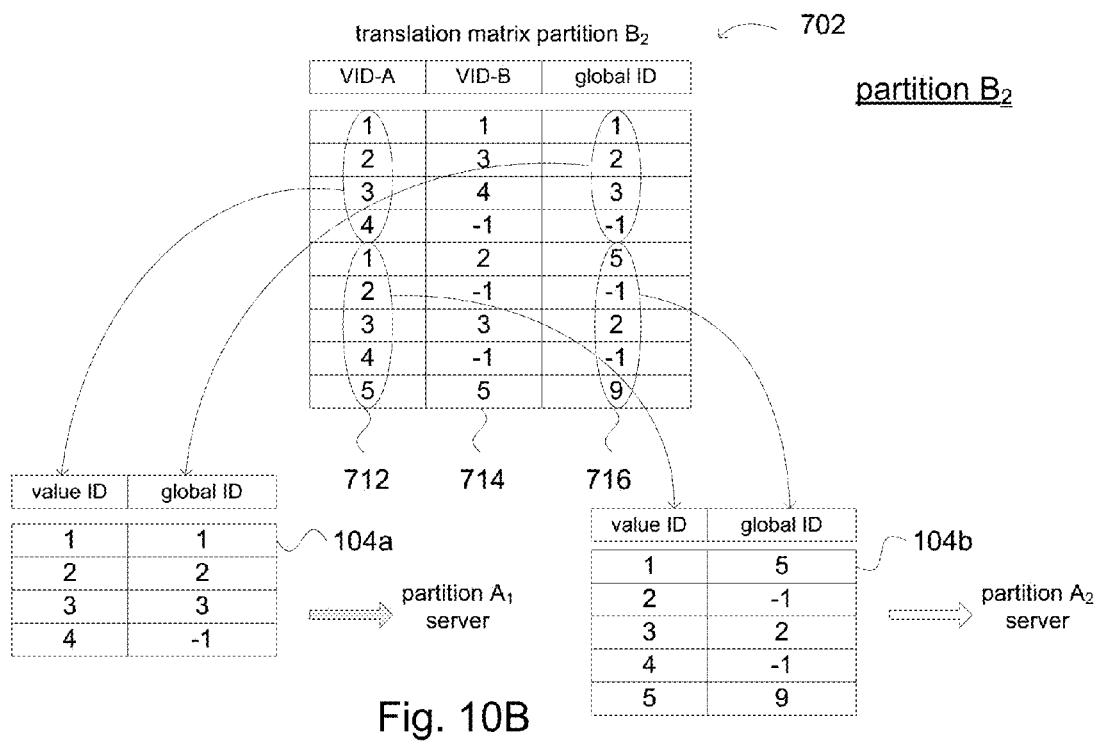

Each partition $B_1$, $B_2$ translates the value IDs that comprise the reduction data 102a, 102b from respective partitions $A_1$, $A_2$, producing a set of translated value IDs. Referring to FIG. 10A, the processing of this step in partition $B_1$ is shown. In an embodiment, the translation matrix 702 for partition $B_1$ can provide the contents of a translated value ID table 104a for partition $A_1$ and a translated value ID table 104b for partition $A_2$. As can be seen, the translated value ID table 104a comprises rows 1-4 from columns 712 and 716 of the translation matrix 702. Likewise, the translated value ID table 104b comprises rows 5-9 from columns 712 and 716 of the translation matrix 702. The tables 104a, 104b provide a translation of value IDs from partitions $A_1$, $A_2$ to the global IDs. In accordance with step 306, the tables 104a, 104b are communicated to and received by respective partitions $A_1$, $A_2$. The same process occurs in partition $B_2$, and is illustrated in FIG. 10B. Accordingly, partition $A_1$ will receive a translation value ID table 104a from partition $B_1$ and from partition $B_2$. Similarly, partition $A_2$ will receive a translation value ID table 104b from partition $B_1$ and from partition $B_2$.

Step 308—Generate Global B Lists

Figure 11A:
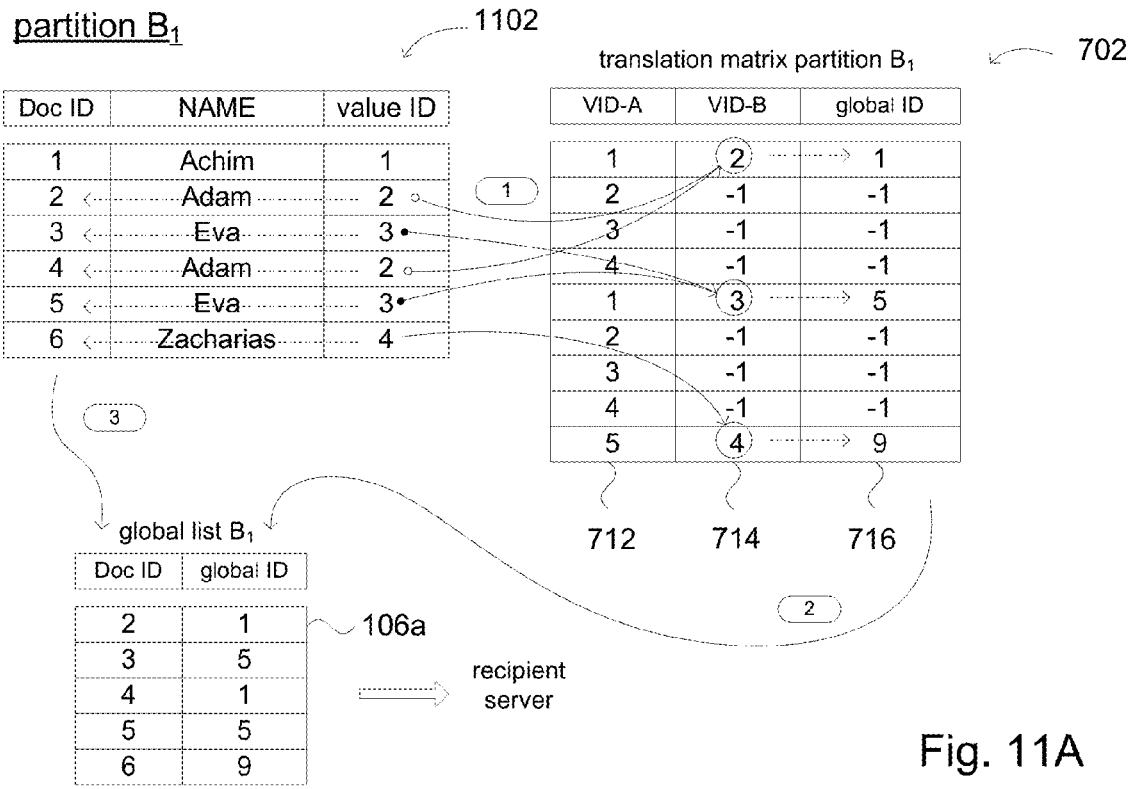
FIGS. 11A-12B illustrate generating globalized lists.

Each partition $B_1$, $B_2$ generates a globalized list that identifies one or more rows stored in the partition. Each row that is identified in the globalized list contains an actual value of the specified attribute which also occurs in one of the partitions $A_1$, $A_2$. Referring to FIG. 11A, processing of this step in partition $B_1$ is shown. In an embodiment, an index table 1102 can be created for partition $B_1$, comprising the Doc ID attribute and the Name attribute obtained from the partition, and a value ID attribute obtained from $B_1$'s local dictionary.

In an embodiment, for each row in the index table 1102: (1) if the value ID appears in column 714 of the translation matrix 702, then (2) copy the corresponding global ID from column 716 into a globalized list 106a for partition $B_1$, and (3) copy the corresponding Doc ID from the index table for all instances of the value ID. For example, value ID 2 appears in column 714 of the translation matrix 702. Two instances of the value ID 2 appear in the index table 1102, and the corresponding Doc IDs are 2 and 4. Accordingly, 2 and 4 are recorded in the globalized list 106a. The global ID corresponding to value ID 2 is 1, and so 1 is recorded in the globalized list 106a next to Doc IDs 2 and 4. This is repeated for value IDs 3 and 4, which also appear in column 714 of the translation matrix 702. The completed globalized list 106a can then be communicated to a recipient server.

Figure 11B:
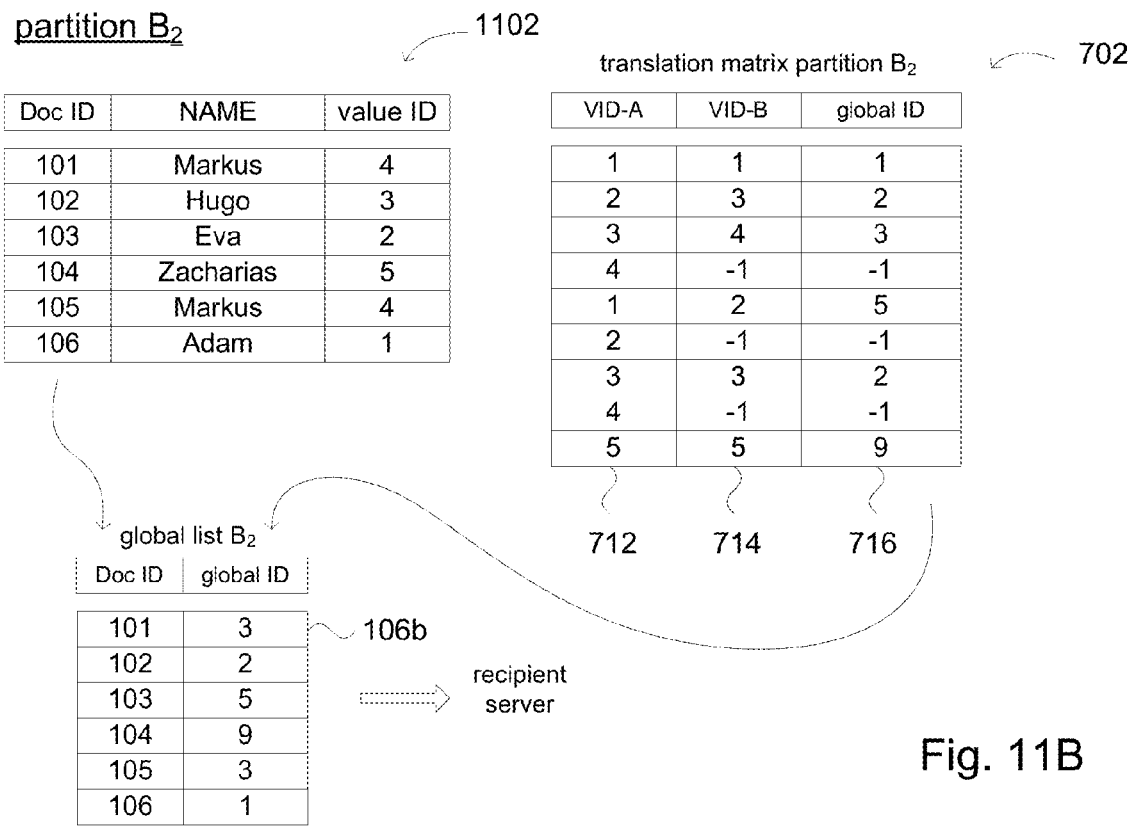

Referring to FIG. 11B, the foregoing is repeated for partition $B_2$: An index table 1102 is created from partition $B_2$. A globalized list 106b is then generated based on the index table and on the translation matrix 702 developed in partition $B_2$. The globalized list 106b is then communicated to the recipient server.

Step 310—Generate Global A Lists

Figure 12A:
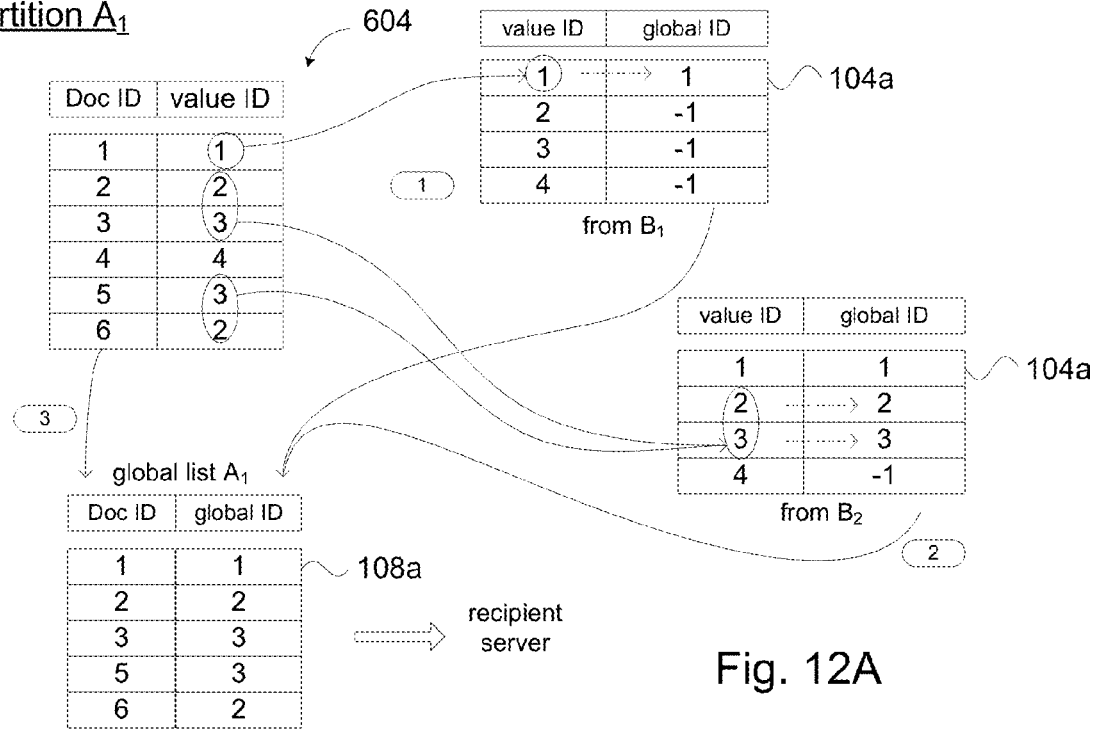
Figure 12B:
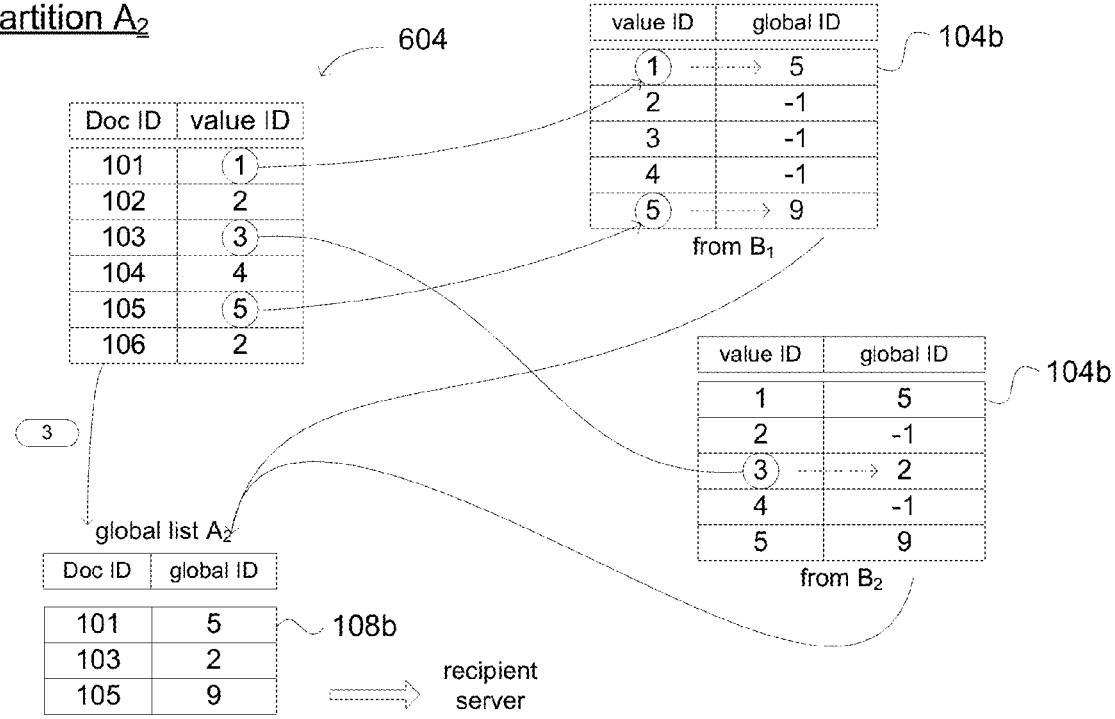

Referring now to FIGS. 12A and 12B, each partition $A_1$, $A_2$ can generate a globalized list using the tupelist list and the translated value ID tables 104a received from the partitions $B_1$, $B_2$. Consider FIG. 12A for a discussion of processing in partition $A_1$. It is noted that in accordance with the present invention, the value IDs in each translated value ID table 104a received from the partitions $B_1$, $B_2$ will map to the same global ID or to "-1", meaning that no translation was made in the respective B partition. For example, value ID 1 maps to global ID 1 in the table 104a received from partition $B_1$. Value ID 1 also maps to global ID 1 in the table 104a received from partition $B_2$. However, value IDs 2, 3, and 4 in the table 104a received from partition $B_1$ were not translated, so these value IDs map to "-1". On the other hand, value IDs 2 and 3 in the table 104a received from partition $B_2$ were (coincidentally) translated to global IDs 2 and 3, respectively. It is noted that the mapped pairs having global ID "-1" can be regarded as having non-matching values in the join operation (e.g. partition $A_1$ value ID 4/Doc ID 4). Those rows would be eliminated in the case of an inner join.

In an embodiment, using the tuple list 604 obtained (FIG. 6) for partition $A_1$, then for each value ID in the tuple list: (1) if the value ID appears in one of the translated value ID tables 104a, then (2) copy the corresponding global ID from that table into a globalized list 108a for partition $A_1$, and (3) copy the corresponding Doc ID from the tuple list for all instances of the value ID. The globalized list 108a is then communicated to the recipient server. This procedure is repeated in partition $A_2$, with reference to FIG. 12B using the tuple list 604 generated for partition $A_2$ and the translated value ID tables 104b received from partitions $B_1$ and $B_2$ to generate a globalized list 108b. The resulting globalized list 108b is then communicated to the recipient server.

Step 312—Compile Combined Lists

Figure 13:
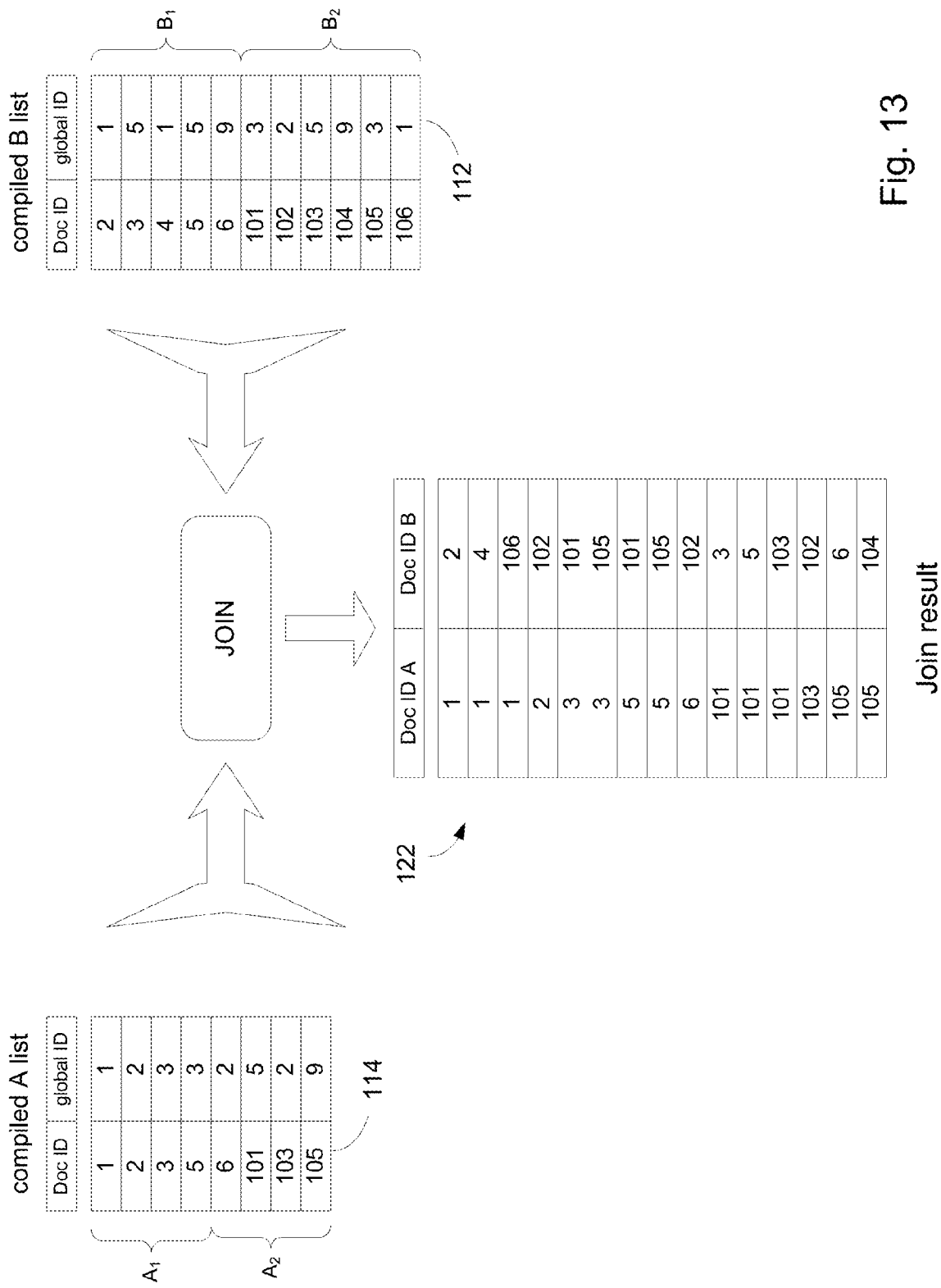
FIG. 13 shows a final step in the join operation of split data tables.

The recipient server will receive the globalized lists 106a, 106b from respective partitions $B_1$, $B_2$. A compiled B list 112 can be created by concatenating the two globalized lists 106a, 106b. This is illustrated in FIG. 13. The compiled B list 112 comprises pairs of Doc IDs and global IDs. The Doc ID identifies those rows among partitions $B_1$ and $B_2$ for which the actual values of the specified attribute (now identified by the global IDs) also occur in at least one of the partitions $A_1$, $A_2$. The figure also shows a compiled A list 114 for the A partitions, created by concatenating globalized lists 108a, 108b. The compiled A list 114 comprises pairs of Doc IDs and global IDs. The Doc ID identifies those rows among partitions $A_1$ and $A_2$ for which the actual values of the specified attribute (now identified by the global IDs) also occur in at least one of the partitions $B_1$, $B_2$.

Step 314—Join the Compiled Lists

Still referring to FIG. 13, a join operation is performed between the compiled A list 114 and the compiled B list 112, where the join condition is based on the global ID attribute. In other words, the join operation is predicated on the global ID in the compiled A list 114 being equal to the global ID in compiled B list 112. The join result 122 is shown in the figure.

A comparison of the join result 122 in FIG. 13 with the join result shown in FIG. 4A will reveal that the two results are identical. The result obtained in FIG. 4A was obtained by joining data tables A and B, which were not split. By comparison, the join result 122 in FIG. 13 was made on partitioned data tables A and B, while at the same time allowing for each database partition $A_1$, $A_2$, $B_1$, $B_2$ to employ a local dictionary on the specified attribute.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for a join operation between a first data table and a second data table based on a first attribute of the first data table and a second attribute of the second data table, the method comprising:
   a server among a plurality of second servers receiving from a plurality of first servers a plurality of value IDs associated with a plurality of first partitions that comprise the first data table, the first partitions distributed among the first servers, the first servers different from the second servers; and
   for a given second partition among a plurality of second partitions that comprise the second data table, distributed among the plurality of second servers, performing at one of the second servers operations including:
      for each of the value IDs, identifying a unique global ID associated with the value ID when an actual value represented by the value ID occurs among actual values comprising the second attribute of the second partition; and
      for each identified unique global ID, pairing the identified unique global ID with a document ID of a data record contained in a second partition stored at the second server in which the actual value in the data record is represented by the value ID associated with the identified unique global ID,
   wherein a plurality of first globalized lists from one or more of the first partitions are combined into a first compiled list,
   wherein a plurality of second globalized lists from one or more of the second partitions are combined into a second compiled list,
   wherein the first and second compiled lists are joined based on global IDs in the first compiled list and the global IDs in the second compiled list.

2. The method of claim 1, wherein a globalized list from one of the first partitions comprises a document ID paired with a global ID from one of the second partitions.

3. The method of claim 2, wherein the document ID identifies a data record in the first partition in which the actual value of its first attribute is represented by the value ID associated with the global ID from one of the second partitions.

4. The method of claim 1, wherein each of the second partitions is associated with a pairing the associates value IDs with unique global IDs.

5. The method of claim 1, further comprising sending each of the second globalized lists to a recipient server, the recipient server generating the second combined list from the second globalized lists received.

6. The method of claim 1, wherein multiple occurrences of an actual value in a global list of a given partition are associated with the same global ID.

7. A non-transitory computer readable storage medium having stored thereon computer executable program code, which when executed, will cause a computer processor in a first server among a plurality of second servers to perform steps for a join operation between a first data table and a second data table based on a first attribute of the first data table and a second attribute of the second data table, the steps including:
   receiving from a plurality of first servers a plurality of value IDs associated with a plurality of first partitions that comprise the first data table, the first partitions distributed among the first servers, the first servers different from the second servers; and
   for a given second partition among a plurality of second partitions that comprise the second data table, distributed among the plurality of second servers, performing operations including:
      for each of the value IDs, identifying a unique global ID associated with the value ID when an actual value represented by the value ID occurs among actual values comprising the second attribute of the second partition; and
      for each identified unique global ID, pairing the identified unique global ID with a document ID of a data record contained in a second partition stored at the second server in which the actual value in the data record is represented by the value ID associated with the identified unique global ID,
   wherein a plurality of first globalized lists from one or more of the first partitions are combined into a first compiled list,
   wherein a plurality of second globalized lists from one or more of the second partitions are combined into a second compiled list,
   wherein the first and second compiled lists are joined based on global IDs in the first compiled list and the global IDs in the second compiled list.

8. The non-transitory computer readable storage medium of claim 7, wherein a globalized list from one of the first partitions comprises a document ID paired with a global ID from one of the second partitions.

9. The non-transitory computer readable storage medium of claim 8, wherein the document ID identifies a data record in the first partition in which the actual value of its first attribute is represented by the value ID associated with the global ID from one of the second partitions.

10. The non-transitory computer readable storage medium of claim 7, wherein each of the second partitions is associated with a pairing the associates value IDs with unique global IDs.

11. The non-transitory computer readable storage medium of claim 7, further comprising sending each of the second globalized lists to a recipient server, the recipient server generating the second combined list from the second globalized lists received.

12. The non-transitory computer readable storage medium of claim 7, wherein multiple occurrences of an actual value in a global list of a given partition are associated with the same global ID.

13. A first server among a plurality of second servers, the first server comprising:
   a computer processor;
   a memory; and
   executable program code stored in the memory to perform a join operation between a first data table and a second data table based on a first attribute of the first data table and a second attribute of the second data table,
   the executable program code, which when executed by the computer processor, will cause the computer processor to:
   receive from a plurality of first servers a plurality of value IDs associated with a plurality of first partitions that comprise the first data table, the first partitions distributed among the first servers, the first servers different from the second servers; and
   for a given second partition among a plurality of second partitions that comprise the second data table, distributed among Hall the plurality of second servers, perform operations including:

for each of the value IDs, identifying a unique global ID associated with the value ID when an actual value represented by the value ID occurs among actual values comprising the second attribute of the second partition; and for each identified unique global ID, pairing the identified unique global ID with a document ID of a data record contained in a second partition stored at the second server in which the actual value in the data record is represented by the value ID associated with the identified unique global ID, wherein a plurality of first globalized lists from one or more of the first partitions are combined into a first compiled list, wherein a plurality of second globalized lists from one or more of the second partitions are combined into a second compiled list, wherein the first and second compiled lists are joined based on global IDs in the first compiled list and the global IDs in the second compiled list.

14. The system of claim 13, wherein a globalized list from one of the first partitions comprises a document ID paired with a global ID from one of the second partitions.

15. The system of claim 14, wherein the document ID identifies a data record in the first partition in which the actual value of its first attribute is represented by the value ID associated with the global ID from one of the second partitions.

16. The non system of claim 13, wherein each of the second partitions is associated with a pairing the associates value IDs with unique global IDs.

17. The system of claim 13, further comprising sending each of the second globalized lists to a recipient server, the recipient server generating the second combined list from the second globalized lists received.

18. The system of claim 13, wherein multiple occurrences of an actual value in a global list of a given partition are associated with the same global ID.

* * * * *